(12) United States Patent
Ohtsuki et al.

(10) Patent No.: US 7,006,153 B2
(45) Date of Patent: Feb. 28, 2006

(54) IMAGE COMPOSITION METHOD, AND IMAGE COMPOSITION APPARATUS

(75) Inventors: Hiroki Ohtsuki, Fukuoka (JP); Tomonori Yonezawa, Fukuoka (JP); Satoshi Kajita, Yukuhashi (JP); Ryuji Fuchikami, Kasuya-gun (JP)

(73) Assignee: Matsushita Electric Industrial Co., Ltd., (JP)

(*) Notice: Subject to any disclaimer, the term of this patent is extended or adjusted under 35 U.S.C. 154(b) by 537 days.

(21) Appl. No.: 10/231,377

(22) Filed: Aug. 30, 2002

(65) Prior Publication Data
US 2003/0043298 A1   Mar. 6, 2003

(30) Foreign Application Priority Data
Aug. 30, 2001  (JP) .............................. 2001-262008

(51) Int. Cl.
*H04N 7/01*   (2006.01)
*G06K 9/36*   (2006.01)

(52) U.S. Cl. ..................................... 348/584; 382/233
(58) Field of Classification Search ........ 348/584–587, 348/578, 598, 599; 382/233, 232, 243
See application file for complete search history.

(56) References Cited

U.S. PATENT DOCUMENTS

| | | | | |
|---|---|---|---|---|
| 4,698,666 A | * | 10/1987 | Lake et al. ................. | 348/584 |
| 5,822,460 A | * | 10/1998 | Kim .......................... | 382/243 |
| 5,933,535 A | * | 8/1999 | Lee et al. ................... | 382/243 |
| 6,356,313 B1 | * | 3/2002 | Champion et al. .......... | 348/558 |
| 6,411,742 B1 | * | 6/2002 | Peterson .................... | 382/284 |
| 6,621,932 B1 | * | 9/2003 | Hagai et al. ................ | 382/233 |

FOREIGN PATENT DOCUMENTS

JP        08297481 A      4/1995

\* cited by examiner

*Primary Examiner*—Paulos M. Natnael
(74) *Attorney, Agent, or Firm*—Steptoe & Johnson LLP

(57) ABSTRACT

An image composition apparatus includes a composition processing unit comprising a composition position determination unit for receiving a shape signal and an image signal which are outputted from an image decoding unit, and determining a composition position of an object as a foreground image; a shape boundary determination unit for determining the shape and boundary of the object; an arbitrary-shaped frame generation unit for generating an outline or frame of the object on the basis of information relating to the shape and boundary of the object; and a pixel composition unit for compositing a target pixel (pixel to be processed) of the object or an arbitrary-shaped frame pixel that is generated by the arbitrary-shaped frame generation unit 4c, with the corresponding pixel in the background image. Therefore, a composite image, in which an outline or an arbitrary-shaped shape is added to an arbitrary-shaped object, can be generated.

18 Claims, 23 Drawing Sheets

30

31

32

33

34

35

36

37

IMAGE COMPOSITION METHOD, AND IMAGE COMPOSITION APPARATUS

FIELD OF THE INVENTION

The present invention relates to a method and an apparatus for image composition and, more particularly, to improved method and apparatus for image composition by which, when an image having a shape is to be composited with another image, an outline or a frame of an arbitrary shape is added to the image.

BACKGROUND OF THE INVENTION

In recent years, moving picture compression technologies have made significant progresses, and H.261 and H.263 of CCITT (International Telegraph and Telephone Consultative Committee) recommendation, and MPEG (Moving Picture Experts Group) of ISO (International Standards Organization) recommendation have been well known as representative international standards.

MPEG has plural standards (phases) as follows: MPEG-1 for compressing video data to 1.5 Mbps, i.e., data of a television signal to about $\frac{1}{100}$; MPEG-2 for compressing video data so that its transmission rate becomes about 2~15 Mbps, which is the standard of current digital television broadcasting that realizes the current television quality; and MPEG-4 which enables coding and handling of video data in object units to realize new functions required for the multimedia age.

A videophone is intended and utilized as one of representative applications of H.261, H.263, and MPEG-4 among the above-mentioned standards. In the videophone, an image composition technique called "picture in picture (PinP)", in which a picture (sub-screen) of a local station (a calling user) is displayed in a picture (main screen) of an opposed station (a called user), is well used.

Further, in the digital television broadcasting as a representative application of MPEG-2, there are many cases where a program table called "EPG (Electric Program Guide)" is displayed in a received image, or plural received programs are displayed in a single received image.

Furthermore, also in the current analog television broadcasting, subtitles such as current time or news flash are generally superimposed on a received image.

As described above, techniques for compositing plural pictures and displaying a composite picture have been frequently employed, and further, there are many cases where a frame for isolating each image to clearly display the image is added to the image.

As a method for adding such frame, there has commonly been employed a technique called "OSD (On Screen Display)" in which a frame is added to an image in a stage subsequent to an image composition stage, or a technique in which a means for writing a graphic pattern for forming a frame is additionally provided, and a frame is added to a display image by compositing the graphic image and the display image.

It is one of features of MPEG-4 that an image signal is coded in object units, and MPEG-4 can handle arbitrary-shaped objects as well as rectangle objects.

An image signal corresponding to each object is composed of a shape signal indicating the shape of the object, and a texture signal indicating the texture of the object. When decoding the image signal, decoding of the shape signal and decoding of the texture signal are respectively carried out by different decoding methods.

Then, composition of a foreground image and a background image is carried out using the respectively decoded shape signal and texture signal, thereby generating a composite display image.

In the conventional technique, however, when it is tried to add a frame or an outline to a specific object in a composite image including arbitrary-shaped objects, since the shape of the object or the object itself cannot be recognized, an accurate frame or outline cannot be added to the object.

Furthermore, in the conventional technique, since it is premised that images to be composited are rectangle, the shape of a frame to be added is also restricted to rectangle.

As described above, according to the conventional image composition method and apparatus, in the image signal processing wherein coding is carried out in object units like the MPEG-4 standard, when an image having an arbitrary shape is composited with another image, it is difficult to add an outline or an arbitrary-shaped frame to the arbitrary-shaped image.

SUMMARY OF THE INVENTION

The present invention is made to solve the above-described problems and has for its object to provide an image composition method and an image composition apparatus, which can perform image processing such as addition of an outline or an arbitrary-shaped frame to an arbitrary-shaped image when the arbitrary-shaped image is composited with another image, and which are applicable to future applications by performing inverse display at a click on an object, visual effect as a selection button, switching between display and non-display of an object by a click, and the like.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, there is provided an image composition method for compositing an image signal which forms a first image space, and includes a shape signal indicating the shape of an arbitrary-shaped object and a texture signal indicating the texture of the object, with an image signal which forms a second image space, and includes a texture signal indicating the texture of an image, thereby generating a composite image signal which forms a third image space, which method comprises: a composition position determination step of determining a composition position of the arbitrary-shaped object in the first image space, on the basis of a composition control signal for controlling image composition; a shape and boundary determination step of determining the shape and boundary of an arbitrary-shaped frame of the arbitrary-shaped object, on the basis of the shape signal indicating the first image space, and an arbitrary-shaped frame control signal for controlling generation of the arbitrary-shaped frame; an arbitrary-shaped frame generation step of generating an arbitrary-shaped frame on the basis of the shape and boundary information that is obtained in the shape and boundary determination step, and the arbitrary-shaped frame control signal, and forming an arbitrary-shaped frame image in which the frame is added to the arbitrary-shaped object; and a pixel composition step of compositing the image of the arbitrary-shaped object in the first image space or the arbitrary-shaped frame image generated in the arbitrary-shaped frame generation step, with the corresponding image in the second image space, thereby generating a composite image that forms the third image space. Therefore, it is possible to obtain a composite image in which an accurate outline or arbitrary-shaped frame is added to an arbitrary-shaped object, whereby the arbitrary-shaped object can be clearly and emphatically displayed in the composite image.

According to a second aspect of the present invention, in the image composition method according to the first aspect, the arbitrary-shaped frame generation step includes a shape type determination step of selecting, as the shape of the frame of the arbitrary-shaped object, either an outline shape corresponding to an outline position based on the boundary information that is obtained in the shape and boundary determination step, or an arbitrary shape corresponding to an arbitrary position that encloses the arbitrary-shaped object, on the basis of the arbitrary-shaped frame control signal. Therefore, an outline of an object or an arbitrary-shaped frame for the object can be displayed in a desired position.

According to a third aspect of the present invention, in the image composition method according to the first aspect, the arbitrary-shaped frame generation step includes a display position determination step of determining, on the basis of the arbitrary-shaped frame control signal, as to whether a frame of an outline shape corresponding to the arbitrary-shaped object should be generated in a position inside or outside the arbitrary-shaped object, which position abuts on the boundary of the object, or in both of positions inside and outside the arbitrary-shaped object, on the basis of the boundary information that is obtained in the shape and boundary determination step. Therefore, an outline of an object or an arbitrary-shaped frame for the object can be displayed in a desired position.

According to a fourth aspect of the present invention, in the image composition method according to the first aspect, in the arbitrary-shaped frame generation step, the width of the arbitrary-shaped frame can be arbitrarily set according to the arbitrary-shaped frame control signal. Therefore, an outline or an arbitrary-shaped frame having a variety of widths can be displayed.

According to a fifth aspect of the present invention, in the image composition method according to the first aspect, in the arbitrary-shaped frame generation step, the color of the arbitrary-shaped frame can be arbitrarily set according to the arbitrary-shaped frame control signal. Therefore, an outline or an arbitrary-shaped frame having a variety of colors can be displayed.

According to a sixth aspect of the present invention, the image composition method according to the first aspect further comprises a composition ratio calculation step of calculating a composition ratio between the image of the arbitrary-shaped object in the first image space or the arbitrary-shaped frame image generated in the arbitrary-shaped frame generation step, and the corresponding image in the second image space; and in the pixel composition step, the image of the arbitrary-shaped object in the first image space or the arbitrary-shaped frame image generated in the arbitrary-shaped frame generation step is composited with the corresponding image in the second image space, on the basis of the composition ratio that is calculated in the composition ratio calculation step. Therefore, it is possible to obtain a composite image in which a background image can be seen through a foreground image, and an outline or an arbitrary-shaped frame is added to the foreground image.

According to a seventh aspect of the present invention, the image composition method according to the first aspect further comprises a scaling ratio calculation step of calculating a scale-up or scale-down ratio between the image of the arbitrary-shaped object in the first image space or the arbitrary-shaped frame image generated in the arbitrary-shaped frame generation step, and the corresponding image in the second image space; and in the pixel composition step, the image of the arbitrary-shaped object in the first image space or the arbitrary-shaped frame image generated in the arbitrary-shaped frame generation step is composited with the corresponding image in the second image space, on the basis of the composition ratio that is calculated in the composition ratio calculation step. Therefore, it is possible to obtain a composite image in which a foreground image is scaled up or down, and an outline or an arbitrary-shaped frame is added to the foreground image.

According to an eighth aspect of the present invention, the image composition method according to the first aspect further comprises a rotation ratio calculation step of calculating a rotation ratio between the image of the arbitrary-shaped object in the first image space or the arbitrary-shaped frame image that is generated in the arbitrary-shaped frame generation step, and the corresponding image in the second image space, on the basis of the composition control information; and in the pixel composition step, the image of the arbitrary-shaped object in the first image space or the arbitrary-shaped frame image generated in the arbitrary-shaped frame generation step is composited with the corresponding image in the second image space, on the basis of the rotation ratio that is calculated in the rotation ratio calculation step. Therefore, it is possible to obtain a composite image in which a foreground image is rotated, and an outline or an arbitrary-shaped frame is added to the rotated foreground image.

According to a ninth aspect of the present invention, there is provided an image composition apparatus for compositing an image signal which forms a first image space, and includes a shape signal indicating the shape of an arbitrary-shaped object and a texture signal indicating the texture of the object, with an image signal which forms a second image space, and includes a texture signal indicating the texture of an image, thereby generating a composite image signal which forms a third image space, which apparatus comprises: a system control means for outputting a composition control signal for controlling image composition, and an arbitrary-shaped frame control signal for controlling generation of an arbitrary-shaped frame of the arbitrary-shaped object; a composition position determination means for determining a composition position of the arbitrary-shaped object in the first image space, on the basis of the composition control signal from the system control means; a shape and boundary determination means for determining the shape and boundary of the arbitrary-shaped frame, on the basis of the shape signal indicating the first image space, and the arbitrary-shaped frame control signal from the system control means; an arbitrary-shaped frame generation means for generating an arbitrary-shaped frame on the basis of the shape and boundary information from the shape and boundary determination means, and the arbitrary-shaped frame control signal from the system control means, and creating an arbitrary-shaped frame image in which the frame is added to the arbitrary-shaped object; and a pixel composition means for compositing the image of the arbitrary-shaped object in the first image space or the arbitrary-shaped frame image generated by the arbitrary-shaped frame generation means, with the corresponding image in the second image space, thereby creating a composite image that forms the third image space. Therefore, it is possible to obtain a composite image in which an accurate outline or arbitrary-shaped frame is added to an arbitrary-shaped object, whereby the arbitrary-shaped object can be clearly and emphatically displayed in the composite image. Further, since the above-mentioned construction can be realized without using a display control unit such as an OSD, it is possible to constitute an image composition apparatus that is superior to conventional apparatuses from the viewpoints of reductions in size and weight, power consumption, and costs.

According to a tenth aspect of the present invention, the image composition apparatus according to the ninth aspect further comprises a shape type determination means for selecting, as the shape of the frame of the arbitrary-shaped object, either an outline shape corresponding to an outline position based on the boundary information that is obtained by the shape and boundary determination means, or an arbitrary shape corresponding to an arbitrary position that encloses the arbitrary-shaped object, on the basis of the arbitrary-shaped frame control signal. Therefore, an outline of an object or an arbitrary-shaped frame for the object can be displayed in a desired position.

According to an eleventh aspect of the present invention, the image composition apparatus according to the ninth aspect further comprises a display position determination means for determining, on the basis of the arbitrary-shaped frame control signal, as to whether a frame of an outline shape corresponding to the arbitrary-shaped object should be generated in a position inside or outside the arbitrary-shaped object, which position abuts on the boundary of the object, or in both of positions inside and outside the arbitrary-shaped object, on the basis of the boundary information that is obtained by the shape and boundary determination means. Therefore, an outline of an object or an arbitrary-shaped frame for the object can be displayed in a desired position.

According to a twelfth aspect of the present invention, the image composition apparatus according to the ninth aspect further comprises a frame width setting means for setting a width of an arbitrary-shaped frame, on the basis of the arbitrary-shaped frame control signal from the system control means; and the arbitrary-shaped frame generation means generates an arbitrary-shaped frame having the width that is set by the frame width setting means, and creating an arbitrary-shaped frame image in which the frame is added to the arbitrary-shaped object. Therefore, an outline or an arbitrary-shaped frame having a variety of widths can be displayed.

According to a thirteenth aspect of the present invention, the image composition apparatus according to the ninth aspect further comprises a frame color setting means for setting an arbitrary color of an arbitrary-shaped frame on the basis of the arbitrary-shaped frame control signal from the system control means; and the arbitrary-shaped frame generation means generates an arbitrary-shaped frame having the color that is set by the frame color setting means, and creating an arbitrary-shaped frame image in which the frame is added to the arbitrary-shaped object. Therefore, an outline or an arbitrary-shaped frame having a variety of colors can be displayed.

According to a fourteenth aspect of the present invention, the image composition apparatus according to the ninth aspect further comprises a composition ratio calculation means for calculating a composition ratio between the image of the arbitrary-shaped object in the first image space or the arbitrary-shaped frame image generated by the arbitrary-shaped frame generation means, and the corresponding image in the second image space; and the pixel composition means composites the image of the arbitrary-shaped object in the first image space or the arbitrary-shaped frame image generated by the arbitrary-shaped frame generation means, with the corresponding image in the second image space, on the basis of the composition ratio that is calculated by the composition ratio calculation means. Therefore, it is possible to obtain a composite image in which a background image can be seen through a foreground image, and an outline or an arbitrary-shaped frame is added to the foreground image.

According to a fifteenth aspect of the present invention, the image composition apparatus according to the ninth aspect further comprises a scaling ratio calculation means for calculating a scale-up or scale-down ratio between the image of the arbitrary-shaped object in the first image space or the arbitrary-shaped frame image generated by the arbitrary-shaped frame generation means, and the corresponding image in the second image space; and the pixel composition means composites the image of the arbitrary-shaped object in the first image space or the arbitrary-shaped frame image generated by the arbitrary-shaped frame generation means, with the corresponding image in the second image space, on the basis of the scale-up or scale-down ratio that is calculated by the scaling ratio calculation means. Therefore, it is possible to obtain a composite image in which a foreground image is scaled up or down, and an outline or an arbitrary-shaped frame is added to the foreground image.

According to a sixteenth aspect of the present invention, the image composition apparatus according to the ninth aspect further comprises a rotation ratio calculation means for calculating a rotation ratio between the image of the arbitrary-shaped object in the first image space or the arbitrary-shaped frame image that is generated by the arbitrary-shaped frame generation means, and the corresponding image in the second image space, on the basis of the composition control information; and the pixel composition means composites the image of the arbitrary-shaped object in the first image space or the arbitrary-shaped frame image generated by the arbitrary-shaped frame generation means, with the corresponding image in the second image space, on the basis of the rotation ratio that is calculated by the rotation ratio calculation means. Therefore, it is possible to obtain a composite image in which a foreground image is rotated, and an outline or an arbitrary-shaped frame is added to the rotated foreground image.

According to a seventeenth aspect of the present invention, in the image composition apparatus according to the ninth aspect, when a coded signal corresponding to the shape signal and image signal of the arbitrary-shaped object includes composition control information for controlling the image composition process, and arbitrary-shaped frame control information for controlling generation of an arbitrary-shaped frame for the arbitrary-shaped object, the composition position determination means, shape and boundary determination means, and arbitrary-shaped frame generation means refer to the composition control information and the arbitrary-shaped frame control information which are included in the coded signal, instead of the composition control signal and the arbitrary-shaped frame control signal which are transmitted from the system control means.

According to an eighteenth aspect of the present invention, in the image composition apparatus according to the ninth aspect, when a coded signal corresponding to the shape signal and image signal of the arbitrary-shaped object includes composition control information for controlling the image composition process, and arbitrary-shaped frame control information for controlling generation of an arbitrary-shaped frame for the arbitrary-shaped object, the composition position determination means, shape and boundary determination means, and arbitrary-shaped frame generation means select either the composition control signal and the arbitrary-shaped frame control signal which are transmitted from the system control means, or the composition control information and the arbitrary-shaped frame control information which are included in the coded signal.

DETAILED DESCRIPTION OF THE PREFERRED EMBODIMENTS

[Embodiment 1]

Figure 1:
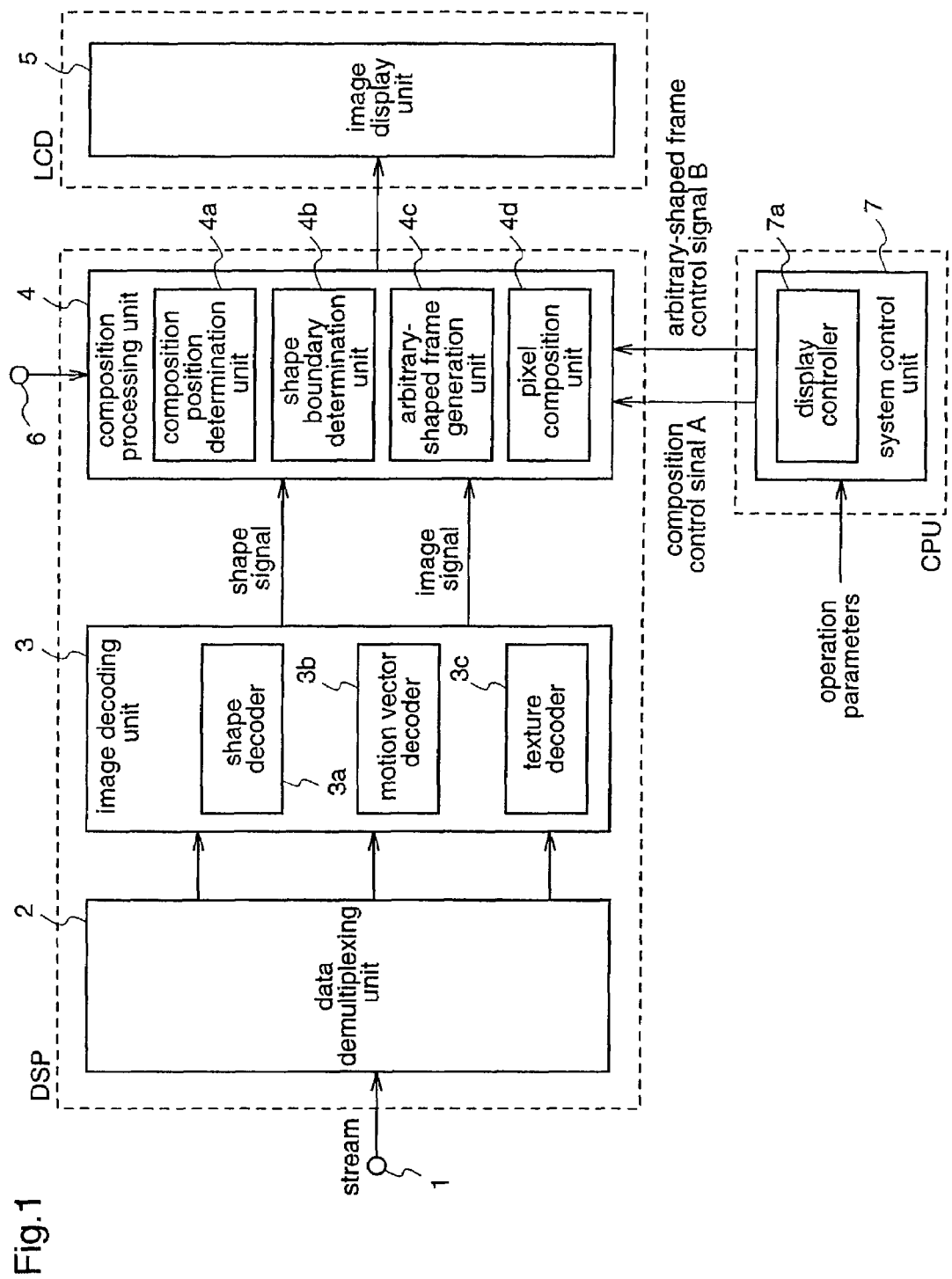
FIG. 1 is a block diagram illustrating the construction of an image composition apparatus according to a first embodiment of the invention.

FIG. 1 is a block diagram illustrating the construction of an image composition apparatus according to a first embodiment of the present invention. With reference to FIG. 1, the image composition apparatus comprises an input terminal 1, a data demultiplexing unit 2, an image decoding unit 3, a composition processing unit 4, an image display unit 5, a second input terminal 6, and a system control unit 7. The input terminal 1 is supplied with a bit stream in which information and signals described as follows are variable-length coded: header information in which information for decoding image data is described; a shape signal (shape information) indicating the shape of the image data; a motion vector signal (motion vector information) indicating a difference in positions of target regions between a current VOP (Video Object Plane) image and a reference VOP image that is time-wise adjacent to the current VOP image; and a texture signal (pixel information) of the image data.

The data demultiplexing unit 2 demultiplexes the data of the shape signal, motion vector signal, and texture signal, which are included in the bit stream. The image decoding unit 3 comprises a shape decoder 3a, a motion vector decoder 3b, and a texture decoder 3c, and performs image decoding on the coded data outputted from the data demultiplexing unit 2. The system control unit 7 controls the whole system. Further, the system control unit 7 is provided with a display controller 7a which outputs a composition control signal A for controlling generation of a composite image of a foreground image and a background image, and an arbitrary-shaped frame control signal B for controlling generation of an outline or display frame having an arbitrary shape during the composition process, on the basis of the shape signal and the image signal which are decoded by the image decoding unit 3.

Further, the composition processing unit 4 comprises a composition position determination unit 4a for determination a composition position in a display region, on the basis of the composition control signal A and the arbitrary-shaped frame control signal B which are transmitted from the system control unit 7; a shape and boundary determination unit 4b for determining the boundary and shape of an object; an arbitrary-shaped frame generation unit 4c for generating an outline or display frame of an arbitrary-shaped object, on the basis of the information from the shape and boundary determination unit 4b; and a pixel composition unit 4d for compositing a target pixel (a pixel to be processed) of the arbitrary-shaped object or a pixel value of an arbitrary-shaped frame that is generated by the arbitrary-shaped frame generation unit 4c, with the corresponding pixel in the background image. The composition processing unit 4 receives the shape signal and the image signal which are outputted from the image decoding unit 3, and generates a composite image in which a frame of an arbitrary shape is added to an arbitrary-shaped object. The image display unit 5 is implemented by using a LCD (Liquid Crystal Display) or the like, and displays the composite image outputted from the composition processing unit 4. Further, the system control unit 7 is supplied with operation parameters in operating the image composition apparatus when the apparatus is systemized.

Practically, among the constituents described above, the data demultiplexing unit 2, the image decoding unit 3, and the composition processing unit 4 are implemented by using digital signal processors (DSP), and the system control unit 7 is implemented by using a central processing unit (CPU).

It is assumed that each of the texture signal and the shape signal is a multi-valued signal having any value of 1, 2, 3, . . . , 255. However, the shape signal may be a binary signal having a zero value and a nonzero value.

Further, the resolution of the shape signal is identical to the resolution of a luminance signal which is information indicating the brightness of an object. That is, the size of one pixel as a component of an image space obtained from the shape signal is equal to the size of one pixel as a component of an image space obtained from the luminance signal. The shape signal is composed of pixel values corresponding to the respective pixels in the image space. Accordingly, the luminance signal and the shape signal, which correspond to a region enclosing one object on the screen, have the same number of pixel values.

The composition control signal A includes a plurality of information as follows: an object ID; composition position information (X component, Y component); transmittance information indicating the transmittance ratio of the foreground image to the background image; scaling information indicating the scaling ratio of the foreground image to the background image; and rotation information indicating the rotation ratio of the foreground image to the background image.

The arbitrary-shaped frame control signal B includes a plurality of information as follows: whether a frame (outline) is to be displayed or not; the type of the frame (outline) (i.e., outline/rectangle/arbitrary shape); the display position of the frame (outline) (i.e., inside the object/outside the object/inside and output the object); the width of the frame (outline); and the color of the frame (outline).

The image composition apparatus may be provided with three image decoding units 3 to perform parallel decoding on bit streams corresponding to plural objects inputted. The pixel information of the background image, which has already been decoded, generated, or held, is inputted from the second input terminal 6 and sent to the composition processing unit 4. In the composition processing unit 4, the foreground image and the background image are composited by a composition method suited to each shape signal and image signal which are decoded by the image decoding unit 3, on the basis of the composition control signal A and the arbitrary-shaped frame control signal B.

Figure 2:
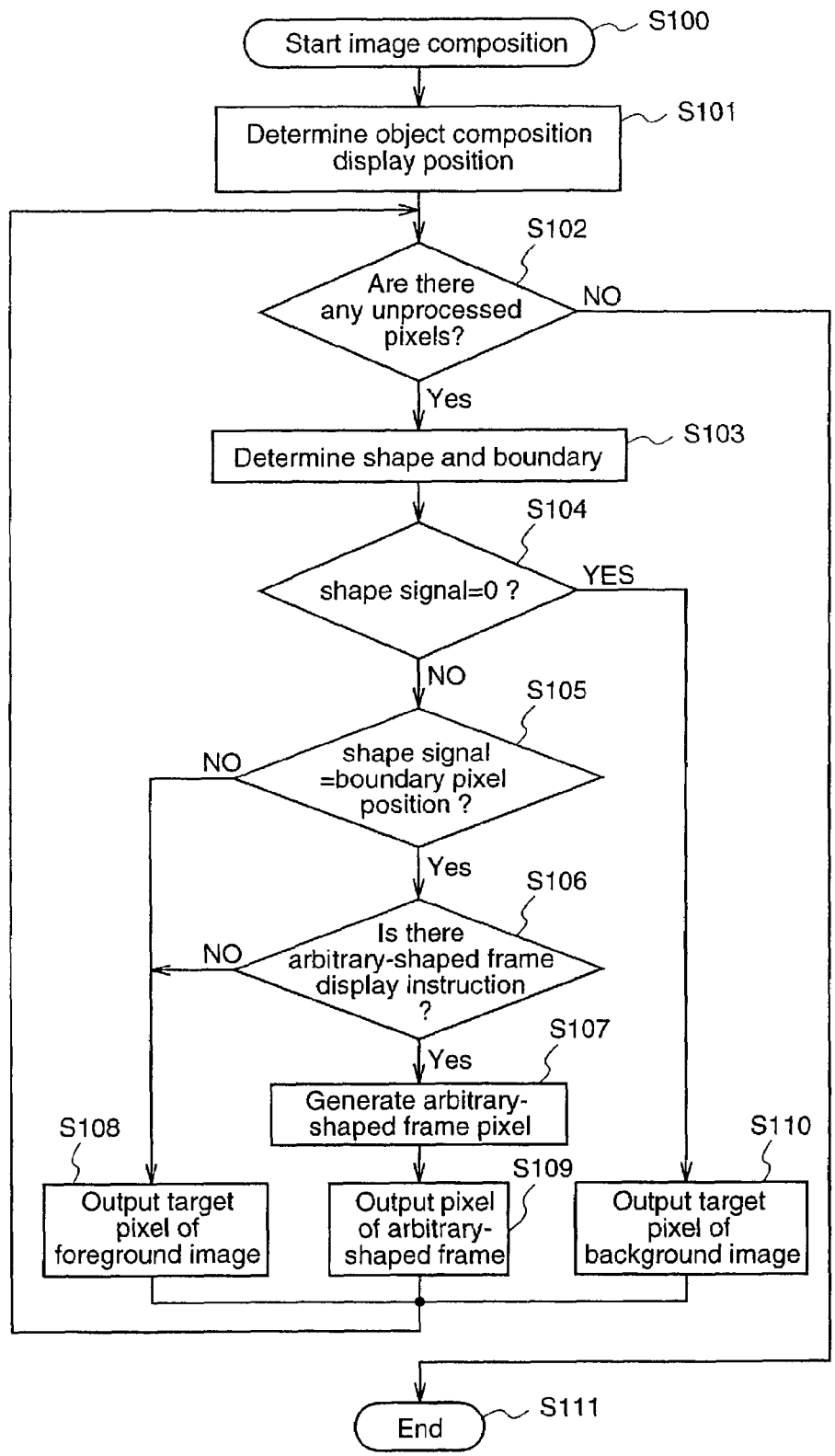
FIG. 2 is a flowchart illustrating the operation of the image composition apparatus according to the first embodiment.

FIG. 2 is a flowchart for explaining the operation of the image composition apparatus according to the first embodiment of the invention. Hereinafter, the operation of the image composition apparatus will be described with reference to FIG. 2.

Initially, when image composition is started (step S100), the composition position determination unit 4a in the composition processing unit 4 calculates an object composition and display position in a display region, on the basis of the composition position information (X component, Y component) included in the composition control signal A that is transmitted from the display controller 7a in the system control unit 7 (step S101).

Subsequently, in step S102 (unprocessed pixel check step), it is checked whether unprocessed pixels exist or not. When unprocessed pixels exist, the processing goes to step S103 (shape and boundary determination step), wherein the shape and boundary determination unit 4b determines the shape and boundary of the object, on the basis of the shape signal outputted from the image decoding unit 3.

Next, when it is determined in step S104 that the value of the shape signal obtained in step S103 is zero, the processing goes to step S110, wherein the pixel composition unit 4d outputs the pixel value (texture signal) of a pixel of the background image, which pixel corresponds to the pixel position of the foreground image to be processed, as a texture signal of a composite pixel.

On the other hand, when it is judged in step S104 that the value of the shape signal is nonzero and it is judged in step S105 that the shape signal does not indicate a boundary pixel of the object, the processing goes to step S108, wherein the pixel composition unit 4d outputs the pixel value (texture signal) corresponding to the pixel position of the foreground image to be processed, as a texture signal of a composite pixel. Further, when it is judged in step S104 that the value of the shape signal is nonzero, and it is judged in step S105 that the shape signal indicates a boundary pixel of the object, and further, it is judged in step S106 that an instruction for displaying an arbitrary-shaped frame is included in the arbitrary-shaped frame control signal B that is transmitted from the display controller 7a in the system control unit 7, the processing goes to step S107 (arbitrary-shaped frame pixel generation step). In step S107, the arbitrary-shaped frame generation unit 4c generates an arbitrary-shaped frame pixel, and the pixel composition unit 4d outputs the pixel value (texture signal) of the arbitrary-shaped frame pixel as a texture signal of a composite pixel (step S109). However, when it is judged in step S106 that there is no instruction for displaying an arbitrary-shaped frame, the processing goes to step S108 (foreground image target pixel output step), wherein the pixel composition unit 4d outputs the pixel value (texture signal) corresponding to the pixel position of the foreground image to be processed, as a texture signal of a composite pixel.

The above-mentioned processes in steps S102~S110 are repeated until it is judged in step S102 that there is no target pixel to be processed. When it is judged in step S102 that there is no unprocessed pixel (target pixel) left, the image composition process is ended (step S111).

Figure 3:
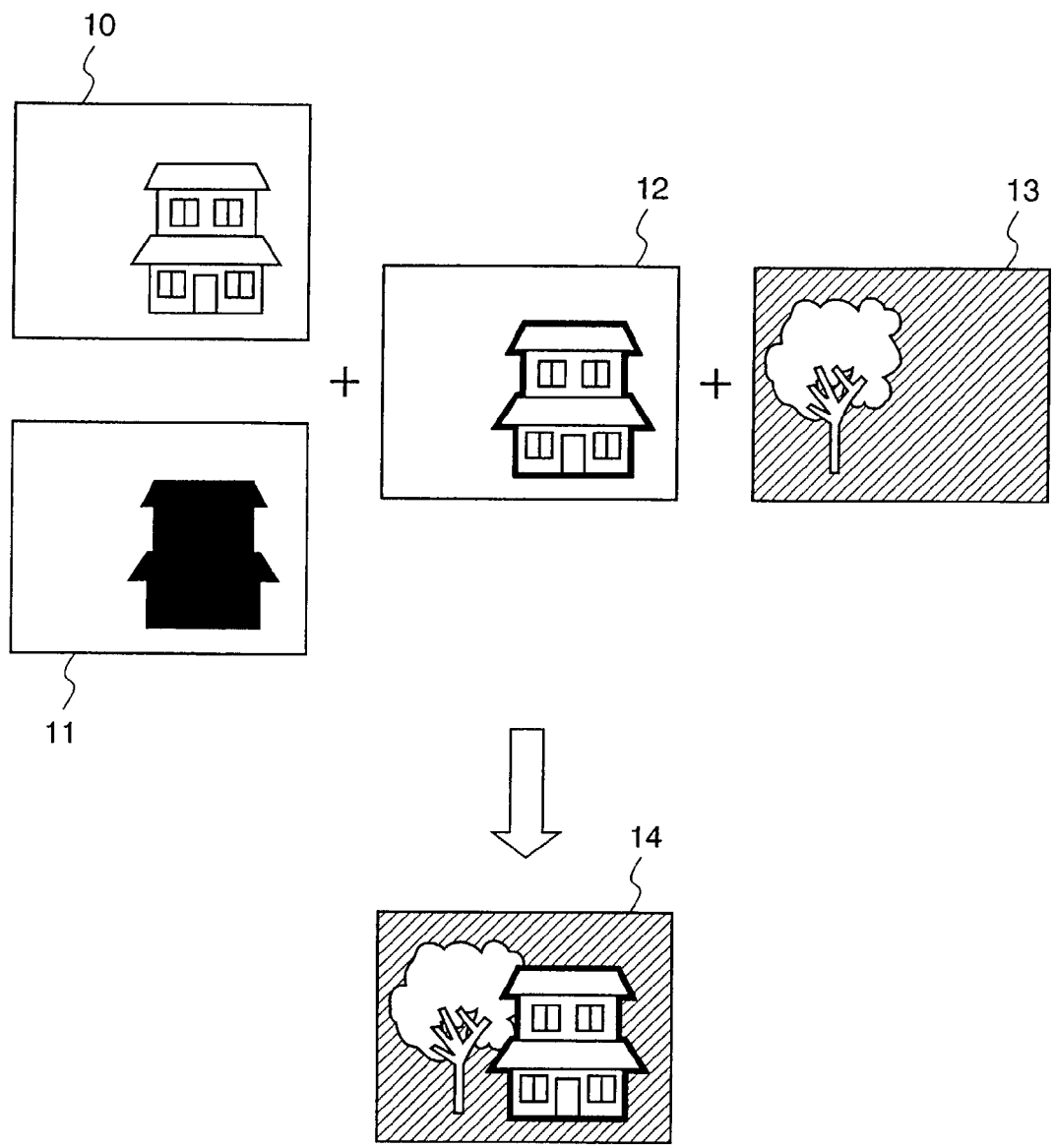
FIG. 3 is a schematic diagram illustrating images for explaining an image composition process according to the first embodiment.

FIG. 3 is a schematic diagram illustrating a composite image generated by the image composition method according to the first embodiment. Hereinafter, the image composition process will be described with reference to FIG. 3.

Initially, the composition processing unit 4 receives a texture signal of an object decoded in the image decoding unit 3, and a shape signal of the object. To be specific, the texture signal is inputted to the composition processing unit 4 as a signal indicating a foreground image 10 in a composite image shown in FIG. 3, and the shape signal is inputted to the unit 4 as a signal indicating a foreground image 11 in the composite image.

Next, when an instruction for displaying an arbitrary-shaped frame is included in the arbitrary-shaped frame control signal B that is transmitted from the display controller 7a in the system control unit 7, the arbitrary-shaped frame generation unit 4c generates an arbitrary-shaped frame image 12. Further, a texture signal indicating a background image 13 is supplied from the second input terminal 6.

Then, in the composition processing unit 4, a composite image 14 is generated from the foreground images 10 and 11, the arbitrary-shaped frame image 12, and the background image 13, and the composite image 14 is output to the image display unit 5.

As described above, according to the image composition apparatus of the first embodiment, the shape and boundary of an arbitrary-shaped object are determined on the basis of the shape signal of the arbitrary-shaped object and the arbitrary-shaped frame control signal B, and an arbitrary-shaped frame is generated on the basis of the shape and boundary information determined, and the foreground image or the arbitrary-shaped frame image is composited with the background image. Therefore, a composite image, in which a frame of an arbitrary shape is added to an arbitrary-shaped object, can be generated, whereby the object is clearly and emphatically displayed.

[Embodiment 2]

Hereinafter, an image composition method and an image composition apparatus according to a second embodiment of the present invention will be described.

Figure 4:
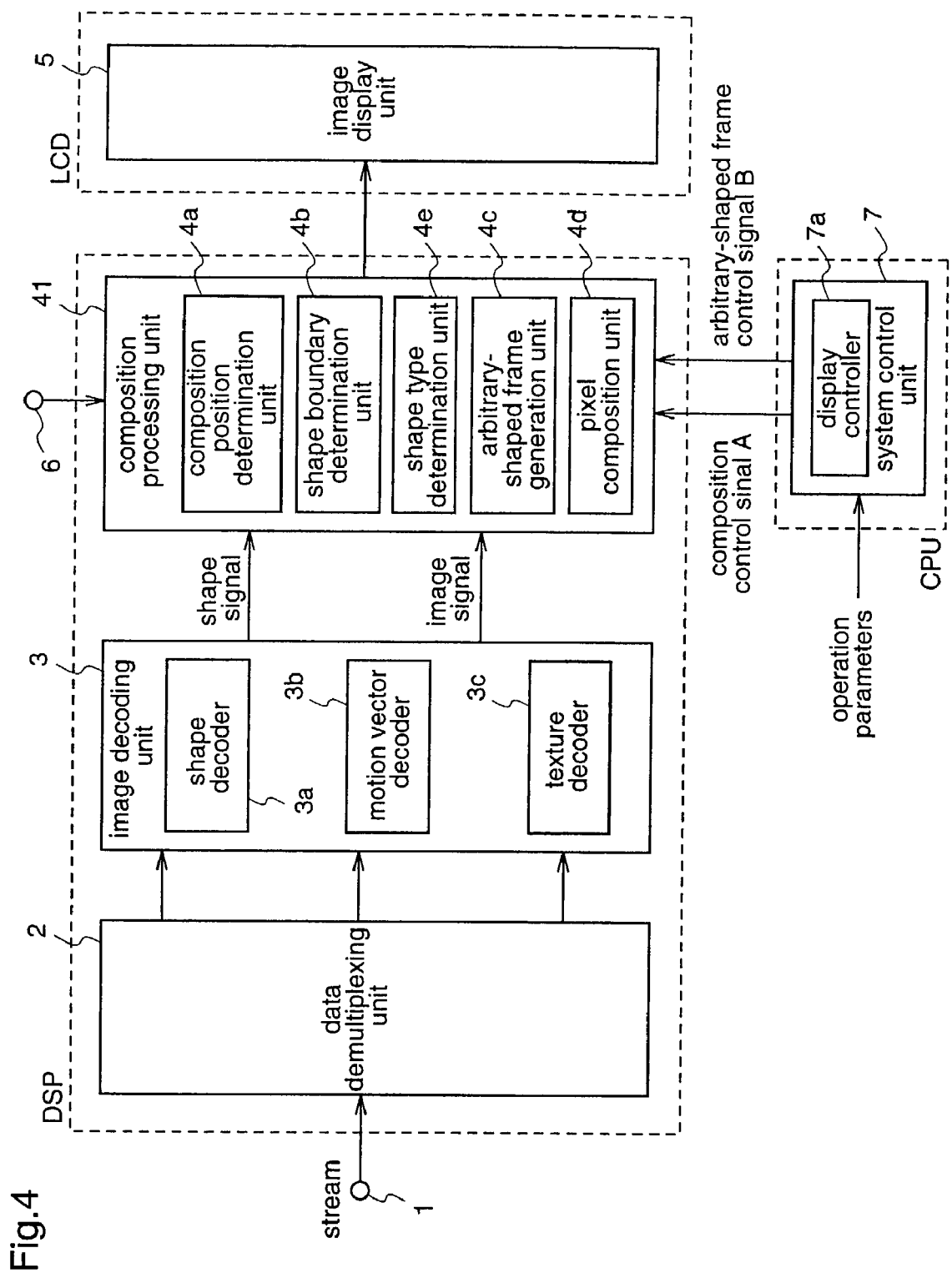
FIG. 4 is a block diagram illustrating the construction of an image composition apparatus according to a second embodiment of the invention.

FIG. 4 is a block diagram illustrating the construction of an image composition apparatus according to the second embodiment. In FIG. 4, the same reference numerals as those shown in FIG. 1 denote the same or corresponding parts. The image composition apparatus according to the second embodiment is different from the image composition apparatus according to the first embodiment only in that it is provided with a composition processing unit 41 in which a shape type determination unit 4e is newly added. When the arbitrary-shaped frame generation unit 4c generates a display frame for an object having an arbitrary shape, the shape type determination unit 4e selects a shape of the frame on the basis of an arbitrary-shaped frame type information which is included in the arbitrary-shaped frame control signal B supplied from the system control unit 7.

Figure 5:
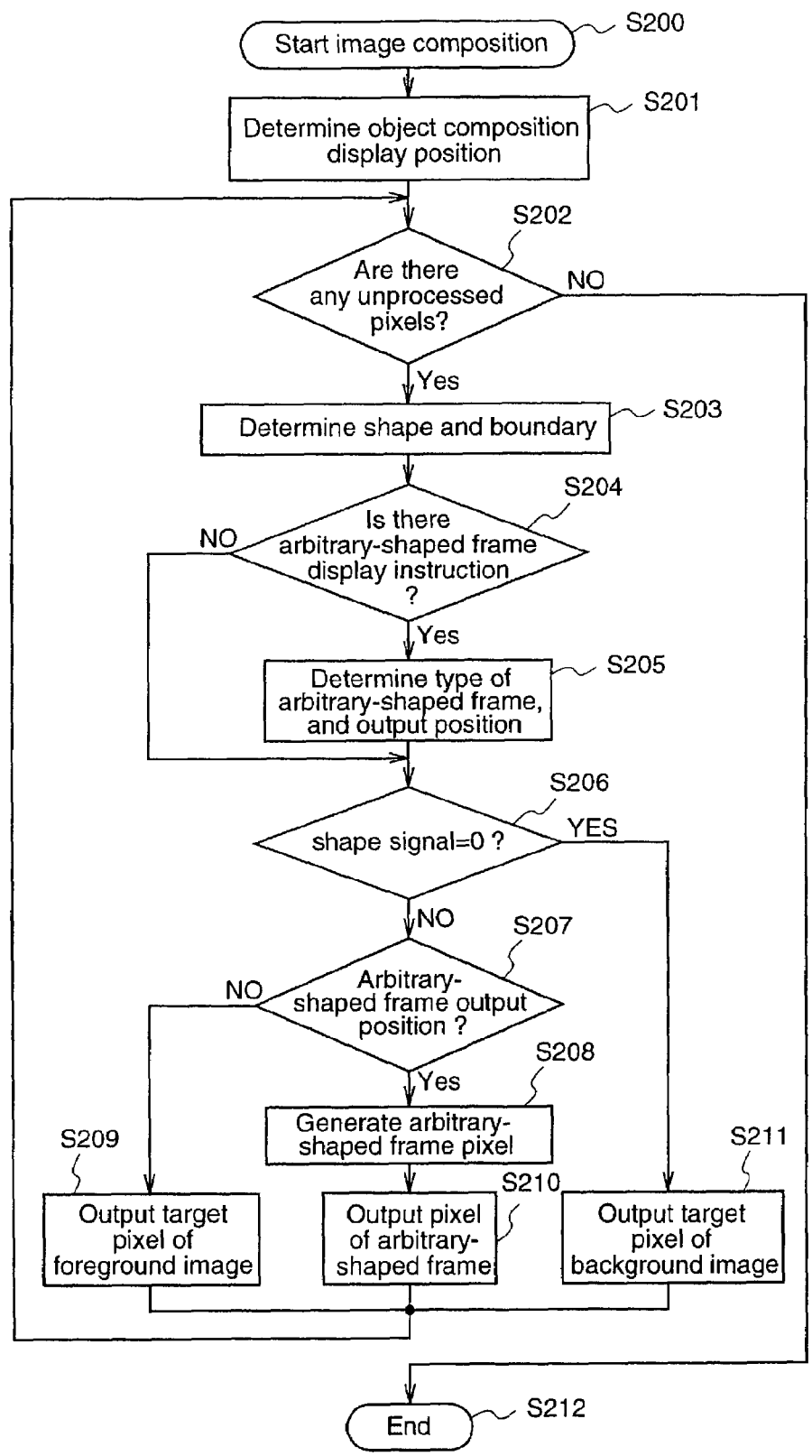
FIG. 5 is a flowchart illustrating the operation of the image composition apparatus according to the second embodiment.

FIG. 5 is a flowchart for explaining the image composition method according to the second embodiment of the invention. Hereinafter, the image composition method will be described with reference to FIG. 5.

Initially, the composition position determination unit 4a in the composition processing unit 4 calculates an object composition display position in a display region, on the basis of the composition position information (X component, Y component) included in the composition control signal A that is transmitted from the display controller 7a in the system control unit 7 (step S201).

Subsequently, in step S202 (unprocessed pixel check step), it is checked whether there are unprocessed pixels or not. When unprocessed pixels exist, the processing goes to step S203 (shape and boundary determination step), wherein the shape and boundary determination unit 4b determines the shape and boundary of the object, on the basis of the shape signal outputted from the image decoding unit 3. Next, when it is judged in step S204 that an instruction for displaying an arbitrary-shaped frame is included in the arbitrary-shaped frame control signal B that is transmitted from the display controller 7a in the system control unit 7, the processing goes to step S205. In step S205, the shape type determination unit 4e selects an arbitrary shape corresponding to an arbitrary position that encloses the object, such as an outline shape corresponding to an outline position of the object or a rectangle shape corresponding to a boundary of a rectangle region that encloses the object, on the basis of the arbitrary-shaped frame type information included in the arbitrary-shaped frame control signal B. Then, the determination unit 4e determines whether or not the pixel being currently processed is a target pixel to be outputted (hereinafter referred to as an output target pixel) of frame of the selected shape. On the other hand, when it is determined in step S204 that there is no instruction for displaying an arbitrary-shaped frame, the process in step S205 is skipped.

When it is determined in step S206 that the value of the shape signal is zero, the pixel composition unit 4d outputs the pixel value (texture signal) of a pixel of the background image, which pixel corresponds to the pixel position of the foreground image to be processed, as a texture signal of a composite pixel (step S211). Further, when it is judged in step S206 that the value of the shape signal is nonzero and it is judged in step S207 that the pixel being currently processed is not an output target pixel of the frame of the shape selected in step S205, the processing goes to step S209. In step S209, the pixel composition unit 4d outputs the pixel value (texture signal) corresponding to the pixel position of the foreground image to be processed, as a texture signal of a composite pixel. On the other hand, when the value of the shape signal is nonzero and the pixel being currently processed is an output target pixel of the frame of the selected shape, the processing goes to step S208 (arbitrary-shaped frame pixel generation step) through steps S206 and S207. In step S208, the arbitrary-shaped frame generation unit 4c generates an arbitrary-shaped frame pixel, and the pixel composition unit 4d outputs the pixel value (texture signal) of the arbitrary-shaped frame pixel as a texture signal of a composite pixel (step S210).

The above-described process steps are repeated until it is judged in step S202 that there is no target pixel to be processed. When it is judged that there is no unprocessed pixel (target pixel) left, the image composition process is ended (step S212).

Even when the pixel being currently processed is an output target pixel of the frame having the shape selected in step S205, if the shape signal value of the arbitrary-shaped object corresponding to the currently processed pixel is zero, an arbitrary-shaped frame pixel is generated with the shape signal value being regarded as nonzero.

Figure 6:
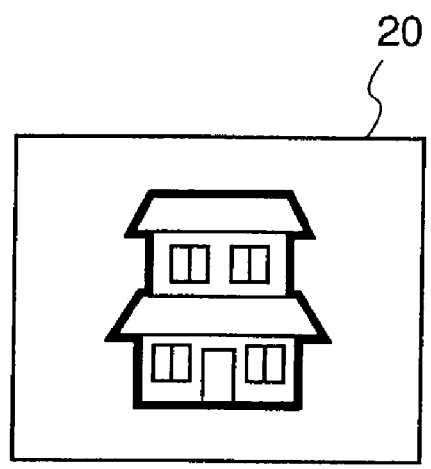
FIG. 6 is a schematic diagram illustrating images for explaining an image composition process according to the second embodiment.
Figure 6:
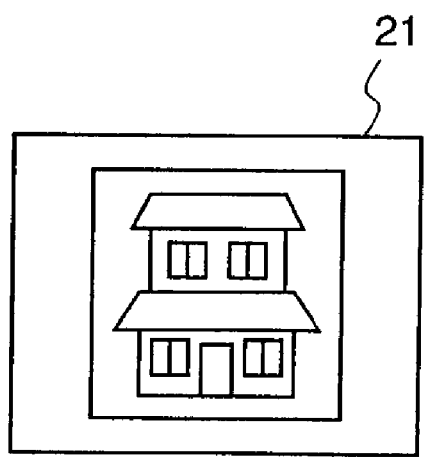
Figure 6:
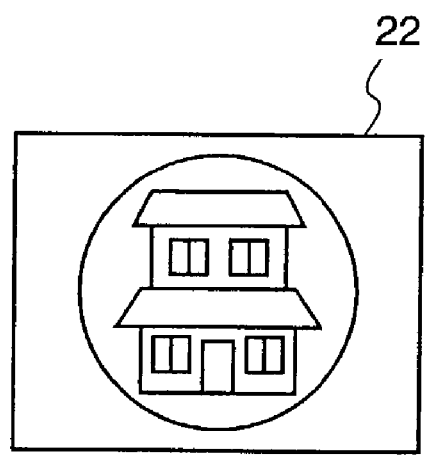

FIG. 6 is a schematic diagram illustrating composite images generated by the image composition method according to the second embodiment. With reference to FIG. 6, a composite image 20 is obtained when the arbitrary-shaped frame type information included in the arbitrary-shaped frame control signal B instructs to generate a display frame having an outline shape corresponding to an outline position of an object. Further, a composite image 21 is obtained when the arbitrary-shaped frame type information included in the arbitrary-shaped frame control signal B instructs to generate a display frame having a rectangle shape corresponding to the boundary of a rectangle region that encloses the object. Further, a composite image 22 is obtained when the arbitrary-shaped frame type information included in the arbitrary-shaped frame control signal B instructs to generate a display frame having an arbitrary shape (in this case, circle) corresponding to an arbitrary position that encloses the object.

When generating the display frame of the outline shape corresponding to the outline position of the object as shown in the composite image 20, it is determined as to whether the pixel being currently processed is an output target pixel of the display frame or not, on the basis of the shape and boundary information of the object that is objected from the shape and boundary determination unit 4b. When it is an output target pixel of the display frame, a pixel of the display frame having the outline shape is generated. When generating the display frame having the rectangle shape corresponding to the boundary of the rectangle region that encloses the object as shown in the composite image 21, a circumference position of the rectangle region is regarded as a display frame pixel output position and, when the pixel being currently processed is an output target pixel of the display frame, a pixel of the display frame having the rectangle shape is generated. Further, when generating the display frame of the arbitrary shape (circle) corresponding to the arbitrary position that encloses the object as shown in the composite image 22, a shape signal of a graphic pattern for forming the display frame of the arbitrary shape is inputted from the second input terminal 6, and it is judged whether the pixel being currently processed is an output target pixel of the display frame or not on the basis of the shape signal of the object and the shape signal of the graphic pattern. When it is an output target pixel of the display frame, a pixel of the display frame having the arbitrary shape is generated.

As described above, according to the image composition apparatus of the second embodiment, an outline-shaped frame corresponding to the outline position of an object, or an arbitrary-shaped frame corresponding to an arbitrary position that encloses the object is generated on the basis of the arbitrary-shaped frame type information included in the arbitrary-shaped frame control signal B, and the foreground image or the arbitrary-shaped frame image is composited with the background image. Therefore, a composite image, in which a display frame of an arbitrary shape is added to an arbitrary-shaped object, can be generated, whereby the object is displayed clearly and emphatically.

[Embodiment 3]

Next, an image composition method and an image composition apparatus according to a third embodiment of the present invention will be described.

Figure 7:
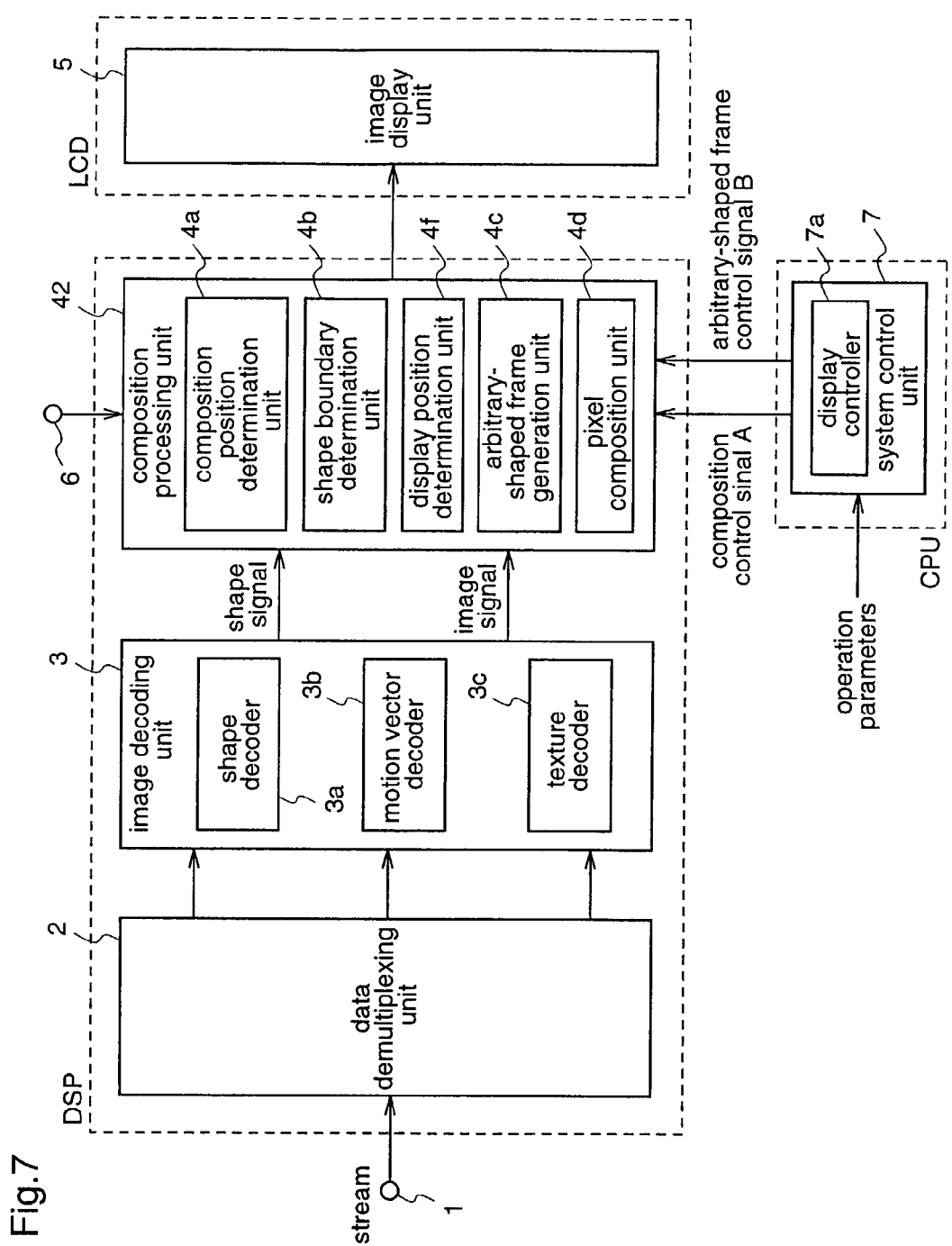
FIG. 7 is a block diagram illustrating the construction of an image composition apparatus according to a third embodiment of the invention.

FIG. 7 is a block diagram illustrating the construction of an image composition apparatus according to the third embodiment. In FIG. 7, the same reference numerals as those shown in FIG. 1 denote the same or corresponding parts. The image composition apparatus according to this third embodiment is different from the image composition apparatus according to the first embodiment only in that it is provided with a composition processing unit 42 in which a display position determination unit 4f is newly added. When the arbitrary-shaped frame generation unit 4c generates an outline-shaped frame for an arbitrary-shaped object, the display position determination unit 4f determines the display position of the outline-shaped frame, on the basis of arbitrary-shaped frame display position information that is included in the arbitrary-shaped frame control signal B supplied from the system control unit 7.

Figure 8:
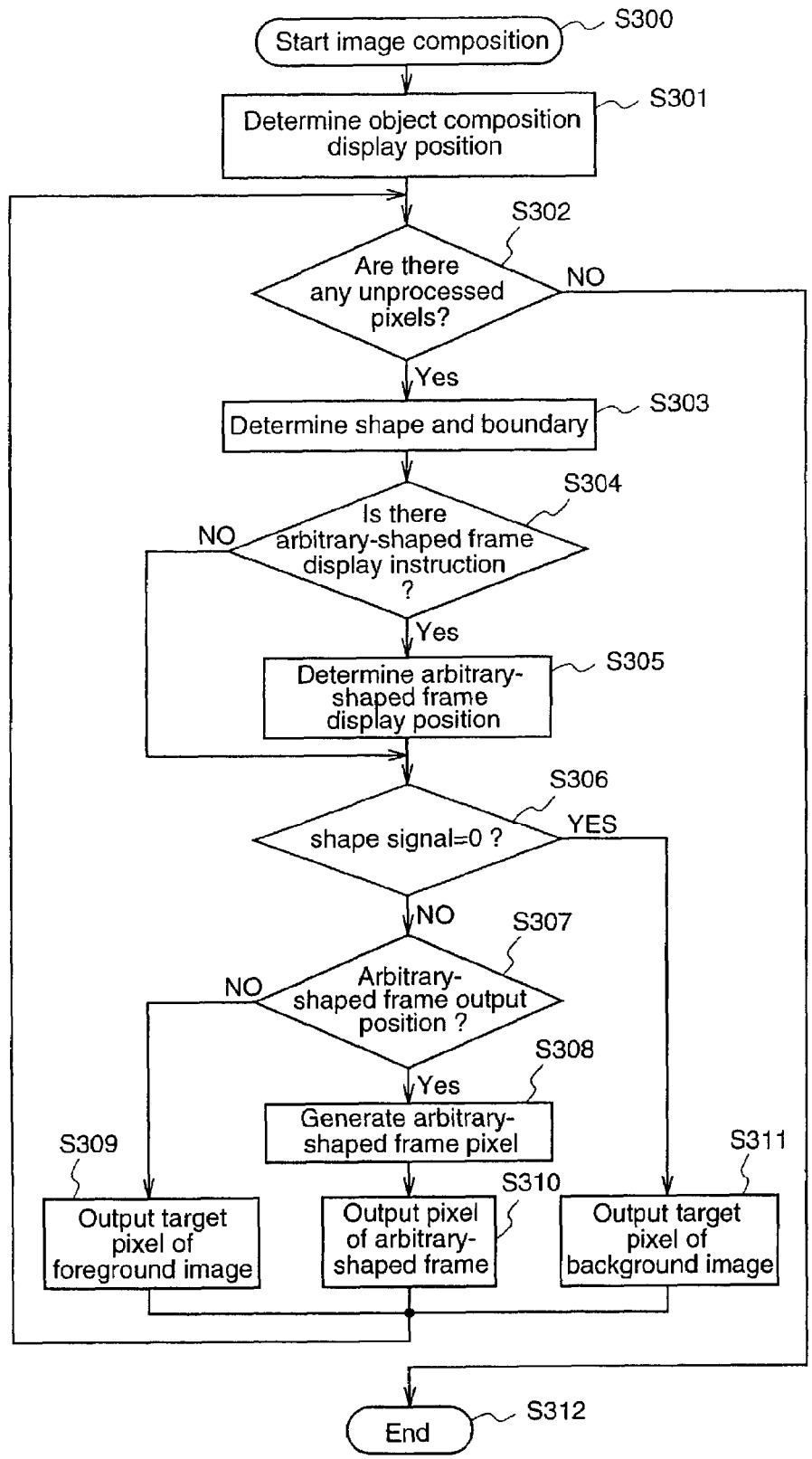
FIG. 8 is a flowchart illustrating the operation of the image composition apparatus according to the third embodiment.

Further, FIG. 8 is a flowchart for explaining an image composition method according to the third embodiment of the invention. Hereinafter, the image composition method will be described with reference to FIG. 8.

Initially, when image composition is started (step S300), the composition position determination unit 4a in the composition processing unit 4 calculates an object composition and display position in a display region, on the basis of the composition position information (X component, Y component) included in the composition control signal A that is transmitted from the display controller 7a in the system control unit 7 (step S301).

Subsequently, in step S302 (unprocessed pixel check step), it is checked whether there are unprocessed pixels or not. When, unprocessed pixels exist, the processing proceeds to step S303 (shape and boundary determination step), wherein the shape and boundary determination unit 4b determines the shape and boundary of the object on the basis of the shape signal outputted from the image decoding unit 3. When it is judged in step S304 that an instruction for displaying an arbitrary-shaped frame is included in the arbitrary-shaped frame control signal B transmitted from the display controller 7a in the system control unit 7, the display position determination unit 4f selects, according to this instruction, a display position from among positions as follows: a position inside the arbitrary-shaped object, which abuts on the boundary of the object; a position outside the arbitrary-shaped object, which abuts on the boundary of the object; and positions inside and outside the arbitrary-shaped object, which includes the boundary of the object. Thereafter, the display position determination unit 4f checks whether or not the pixel being currently processed is an output target pixel of frame of the selected shape (step S305). However, when it is judged in step S304 that there is no instruction for displaying an arbitrary-shaped frame, the process in step S305 is skipped.

When it is judged in step S306 that the value of the shape signal is zero, the pixel composition unit 4d outputs the pixel value (texture signal) of a pixel of the background image, which pixel corresponds to the position of a target pixel (pixel to be processed) of the foreground image, as a texture signal of a composite pixel (step S311). On the other hand, when it is judged in step S306 that the value of the shape signal is nonzero and it is judged in step S307 that the pixel being currently processed is not an output target pixel of the frame having the shape selected in step S205, the pixel composition unit 4d outputs the pixel value (texture signal) corresponding to the position of the target pixel of the foreground image, as a texture signal of a composite pixel (step S309). Further, when it is judged in step S306 that the value of the shape signal is nonzero and it is judged in step S307 that the pixel being currently processed is an output target pixel of the frame having the shape selected in step S305, the processing goes to step S308 (arbitrary-shaped frame pixel generation step S308), wherein the arbitrary-shaped frame generation unit 4c generates an arbitrary-shaped frame pixel, and the pixel composition unit 4d outputs the pixel value (texture signal) of the arbitrary-shaped frame pixel, as a texture signal of a composite image (step S310).

The above-mentioned processes in steps S302 to S311 are repeated until it is judged in step S302 that there is no target pixel to be processed. When it is judged that there is no unprocessed pixel (target pixel) left, the image composition process is ended (step S312).

Even when the pixel being currently processed is an output target pixel corresponding to the display position selected in step S305, if the shape signal value of the arbitrary-shaped object of the currently processed pixel is zero, an arbitrary-shaped frame pixel is generated with the shape signal value being regarded as nonzero.

Figure 9:
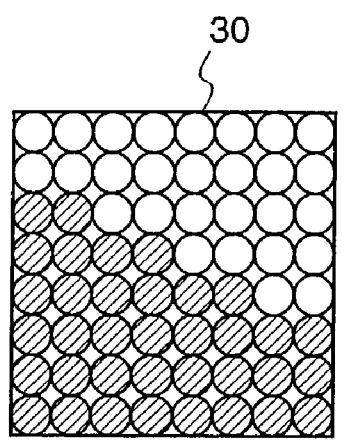
FIG. 9 is a schematic diagram illustrating images for explaining an image composition process according to the third embodiment.
Figure 9:
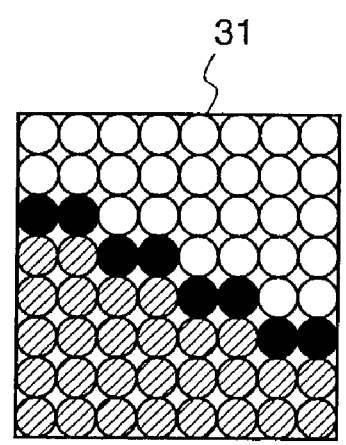
Figure 9:
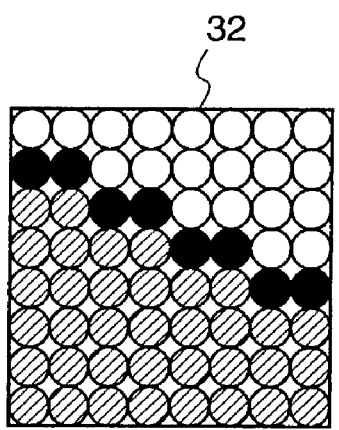
Figure 9:
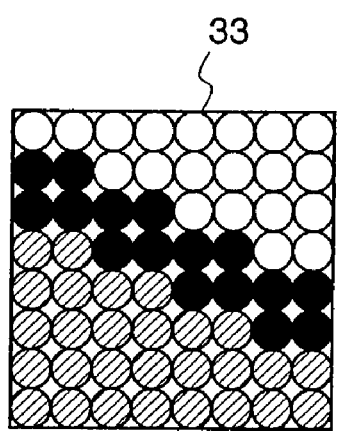

FIG. 9 is a schematic diagram illustrating composite images generated by the image composition method according to the third embodiment. With reference to FIG. 9, in a composite image 30, pixels in a signal block of an object having an arbitrary shape are conceptually illustrated. The composite image 30 is obtained when an arbitrary-shaped frame is not generated. In the composite image 30, hatched circles indicate pixels of the arbitrary-shaped object, i.e., pixels of texture signal components of a foreground image, while white circles indicate pixels of texture signal components of a background image.

On the other hand, a composite image 31 is obtained when an arbitrary-shaped frame is generated inside the arbitrary-shaped object, on the basis of the arbitrary-shaped frame display position information included in the arbitrary-shaped frame control signal B. In the composite image 31, black circles indicate signal components of pixels of the arbitrary-shaped frame. That is, the pixels inside the arbitrary-shaped object, which abut on the boundary of the object in the composite image 30, are replaced with arbitrary-shaped frame pixels.

Furthermore, a composite image 32 is obtained when an arbitrary-shaped frame is generated outside the arbitrary-shaped object on the basis of the arbitrary-shaped frame display position information included in the arbitrary-shaped frame control signal B. That is, pixels outside the arbitrary-shaped object, which abut on the boundary of the object in the composite image 30, are replaced with arbitrary-shaped frame pixels.

Furthermore, a composite image 33 is obtained when an arbitrary-shaped frame is generated inside the arbitrary-shaped object, on the basis of the arbitrary-shaped frame display position information included in the arbitrary-shaped frame control signal B. That is, pixels inside and outside the object, including the boundary of the arbitrary-shaped object in the composite image 30, are replaced with arbitrary-shaped frame pixels.

As described above, according to the image composition apparatus of the third embodiment, when generating an outline-shaped frame for an arbitrary-shaped object on the basis of the shape and boundary information obtained from the shape and boundary determination unit 4b, an arbitrary-shaped frame is generated in a display position that is selected on the basis of the arbitrary-shaped frame display position information that is included in the arbitrary-shaped frame control signal B. Therefore, a composite image, in which an arbitrary-shaped frame is added in a desired position with respect to an arbitrary-shaped object, can be generated, whereby the object can be clearly and emphatically displayed.

[Embodiment 4]

Next, an image composition method and an image composition apparatus according to a fourth embodiment of the present invention will be described.

Figure 10:
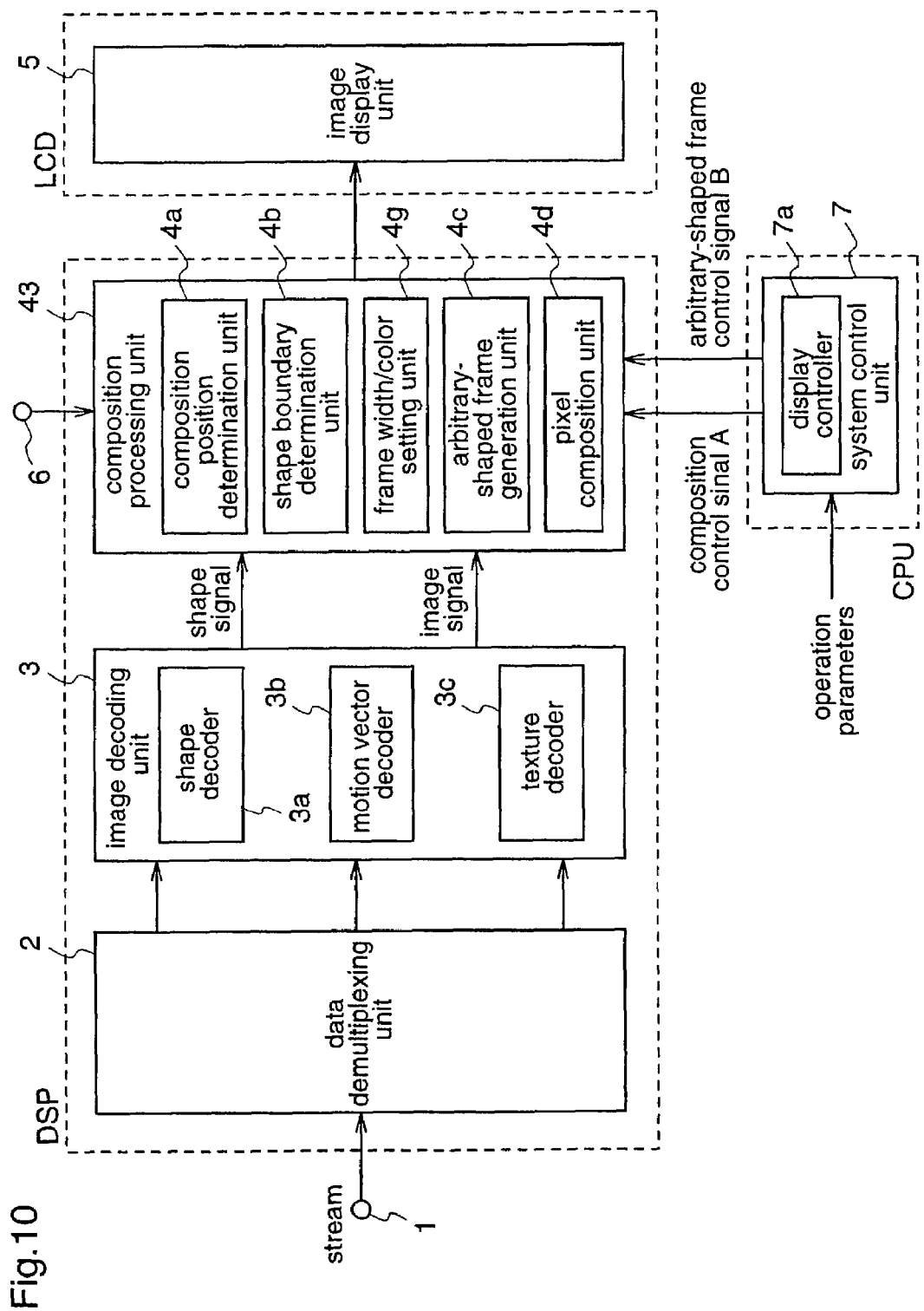
FIG. 10 is a block diagram illustrating the construction of an image composition apparatus according to a fourth embodiment of the invention.

FIG. 10 is a block diagram illustrating the construction of an image composition apparatus according to the fourth embodiment. In FIG. 10, the same reference numerals as those shown in FIG. 1 denote the same or corresponding parts. The image composition apparatus according to the fourth embodiment is different from the image composition apparatus according to the first embodiment only in that it is provided with a composition processing unit 43 in which a frame width/color setting unit 4g is newly added. When the arbitrary-shaped frame generation unit 4c generates a frame of an outline shape corresponding to an arbitrary-shaped object, the frame width/color setting unit 4g sets a width and a color of the frame, on the basis of arbitrary-shaped frame width/color information that is included in the arbitrary-shaped frame control signal B supplied from the system control unit 7.

Figure 11:
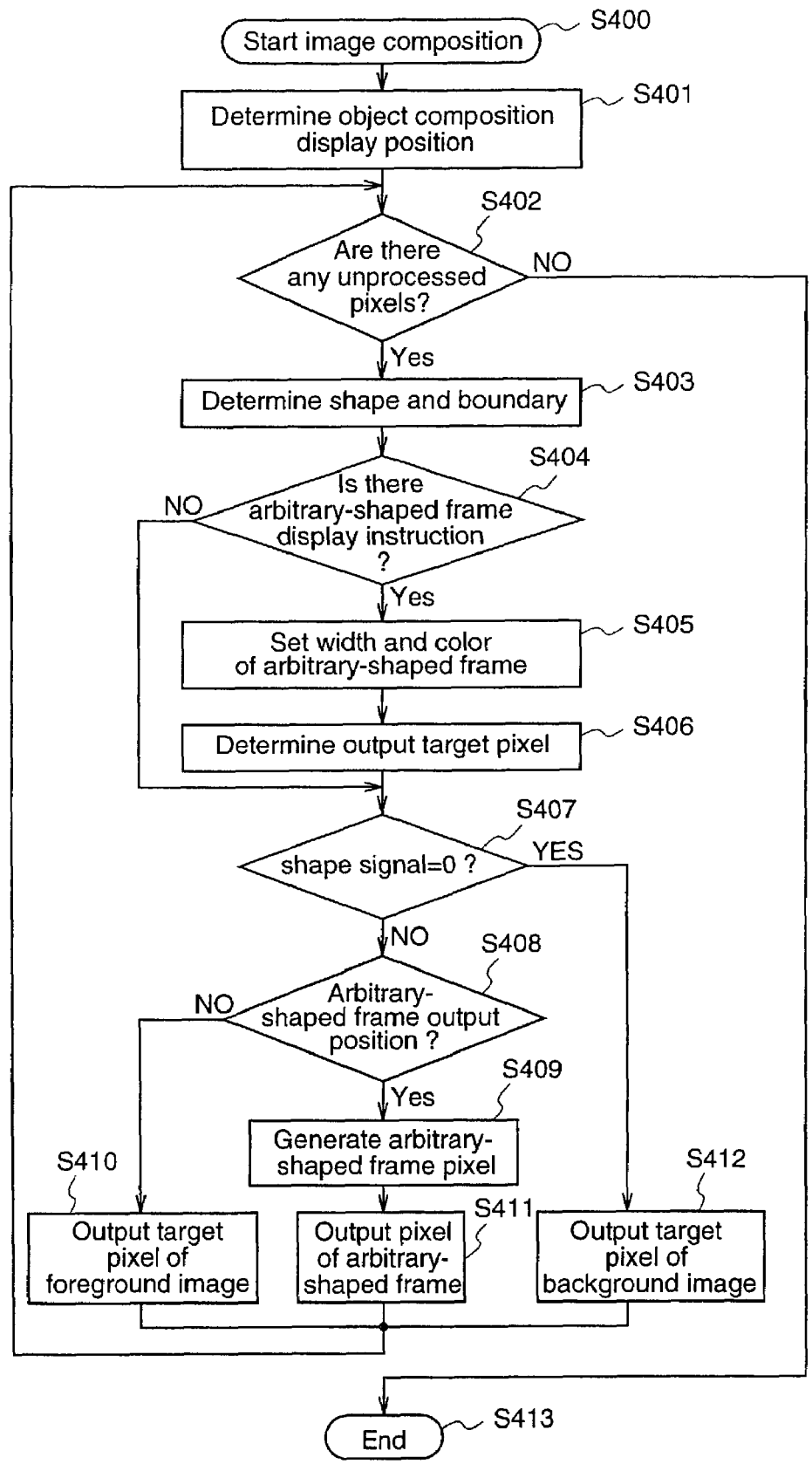
FIG. 11 is a flowchart illustrating the operation of the image composition apparatus according to the fourth embodiment.

FIG. 11 is a flowchart for explaining the image composition method according to the fourth embodiment. Hereinafter, the image composition method will be described with reference to FIG. 11.

Initially, when an image composition process is started (step S400), the composition position determination unit 4a in the composition processing unit 4 calculates an object composition and display position in a display region, on the basis of the composition position information (X component, Y component) included in the composition control signal A that is transmitted from the display controller 7a in the system control unit 7 (step S401).

Subsequently, in step S402 (unprocessed pixel check step), it is checked whether there are unprocessed pixels or not. When unprocessed pixels exist, the processing proceeds to step S403 (shape and boundary determination step), wherein the shape boundary determination unit 4b determines the shape and boundary of the object, on the basis of the shape signal outputted from the image decoding unit 3.

When it is judged in step S404 that an instruction for displaying an arbitrary-shaped frame is included in the arbitrary-shaped frame control signal B that is transmitted from the display controller 7a in the system control unit 7, the frame width/color setting unit 4g sets a width and a color which are indicated by arbitrary-shaped frame width and color information included in the arbitrary-shaped frame control signal B (step S405), and it is checked in step S406 whether the pixel being currently processed is an output target pixel of the arbitrary-shaped frame or not. When there is no instruction for displaying an arbitrary-shaped frame in step S404, the processes in steps S405 and S406 are skipped.

When it is judged in step S407 that the value of the shape signal is zero, the pixel composition unit 4d outputs the pixel value (texture signal) of a pixel of a background image, which pixel corresponds to the position of a target pixel (pixel to be processed) of a foreground image, as a texture signal of a composite image (step S412). On the other hand, when it is judged in step S407 that the value of the shape signal is nonzero and it is judged in step S408 that the pixel being currently process is not an output target pixel of the above-mentioned frame, the pixel composition unit 4d outputs the pixel value (texture signal) corresponding to the position of the target pixel of the foreground image, as a texture signal of a composite pixel (step S410). Furthermore, when it is judged in step S407 that the value of the shape signal is nonzero and it is judged in step S408 that the pixel being currently processed is an output target pixel of the above-mentioned frame, the processing proceeds to step S409 (arbitrary-shaped frame pixel generation step). In step S409, the arbitrary-shaped frame generation unit 4c generates a pixel of an arbitrary-shaped frame having the width and color that are set in step S406, and the pixel composition unit 4d outputs the pixel value (texture signal) of the arbitrary-shaped frame pixel, as a texture signal of a composite image (step S411).

The above-described process steps are repeated until it is judged in step S402 that there is no more target pixel to be processed. When it is judged that there is no unprocessed pixel (target pixel) left, the image composition process is ended (step S413).

Even when the pixel being currently processed is an output target pixel of the frame having the width and color selected in step S406, if the value of the shape signal of the arbitrary-shaped object corresponding to the currently processed pixel is judged as being zero in step S407, an arbitrary-shaped frame pixel is generated with the value of the shape signal being regarded as nonzero.

Figure 12:
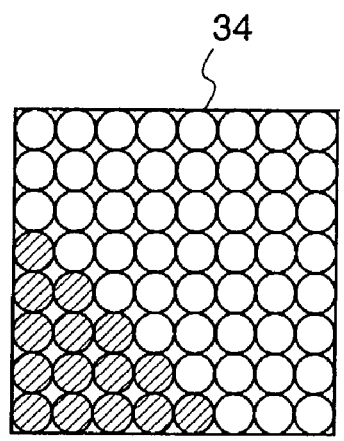
FIG. 12 is a schematic diagram illustrating images for explaining an image composition process according to the fourth embodiment.
Figure 12:
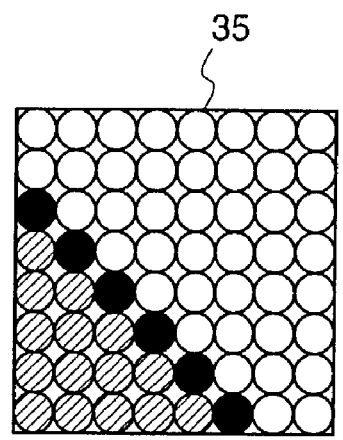
Figure 12:
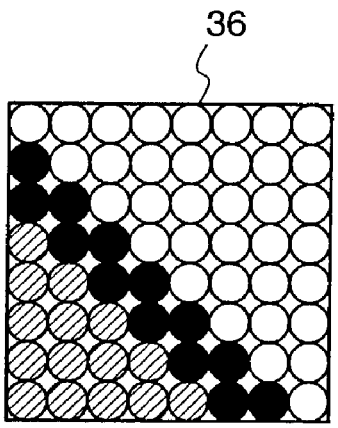
Figure 12:
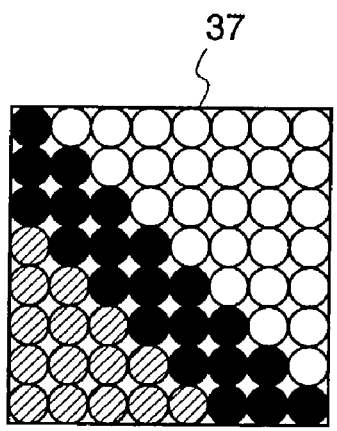

FIG. 12 is schematic diagram illustrating composite images generated by the image composition method according to the fourth embodiment.

With reference to FIG. 12, in a composite image 34, pixels in a signal block of an object having an arbitrary shape are conceptually shown. The composite image 34 is obtained when an arbitrary-shaped frame is not generated. Since circles shown in FIG. 12 are similar to those shown in FIG. 9, repeated description is not necessary.

On the other hand, a composite image 35 is obtained when an arbitrary-shaped frame having a width equivalent to one pixel is generated on the basis of arbitrary-shaped frame width information included in the arbitrary-shaped frame control signal B. Likewise, a composite image 36 is obtained when an arbitrary-shaped frame having a width equivalent to two pixels is generated on the basis of the arbitrary-shaped frame width information, and a composite image 37 is obtained when an arbitrary-shaped frame having a width equivalent to three pixels is generated on the basis of the arbitrary-shaped frame width information.

In FIG. 12, when the display colors of the arbitrary-shaped frames are the same, the arbitrary-shaped object in each composite image can be displayed more emphatically as the number of pixels corresponding to the frame width is increased. Further, even when the number of pixels corresponding to the frame width is only one, the arbitrary-shaped object in the composite image can be clearly and emphatically displayed by selecting a vivid color for the frame.

When the number of pixels corresponding to the frame width is zero in the arbitrary-shaped frame width information included in the arbitrary-shaped frame control signal B, since the composition processing unit 43 generates no arbitrary-shaped frame pixel even when there is an instruction for displaying an arbitrary-shaped frame, a composite image having no arbitrary-shaped frame is generated. Likewise, when a transparent color is designated in the arbitrary-shaped frame color information, a composite image having no arbitrary-shaped frame is generated even when there is an instruction for displaying an arbitrary-shaped frame.

As described above, according to the image composition apparatus of the fourth embodiment, when generating a frame of an arbitrary shape corresponding to an arbitrary-shaped object on the basis of shape boundary information obtained in the shape and boundary determination unit 4b, the arbitrary-shaped frame is generated on the basis of the arbitrary-shaped frame width and color information included in the arbitrary-shaped frame control signal B, and the foreground image or the arbitrary-shaped frame image is composited with the background image. Therefore, a composite image, in which an arbitrary-shaped frame having desired width and color is added to an arbitrary-shaped object, can be generated, whereby the object is clearly and emphatically displayed.

[Embodiment 5]

Next, an image composition method and an image composition apparatus according to a fifth embodiment of the present invention will be described.

Figure 13:
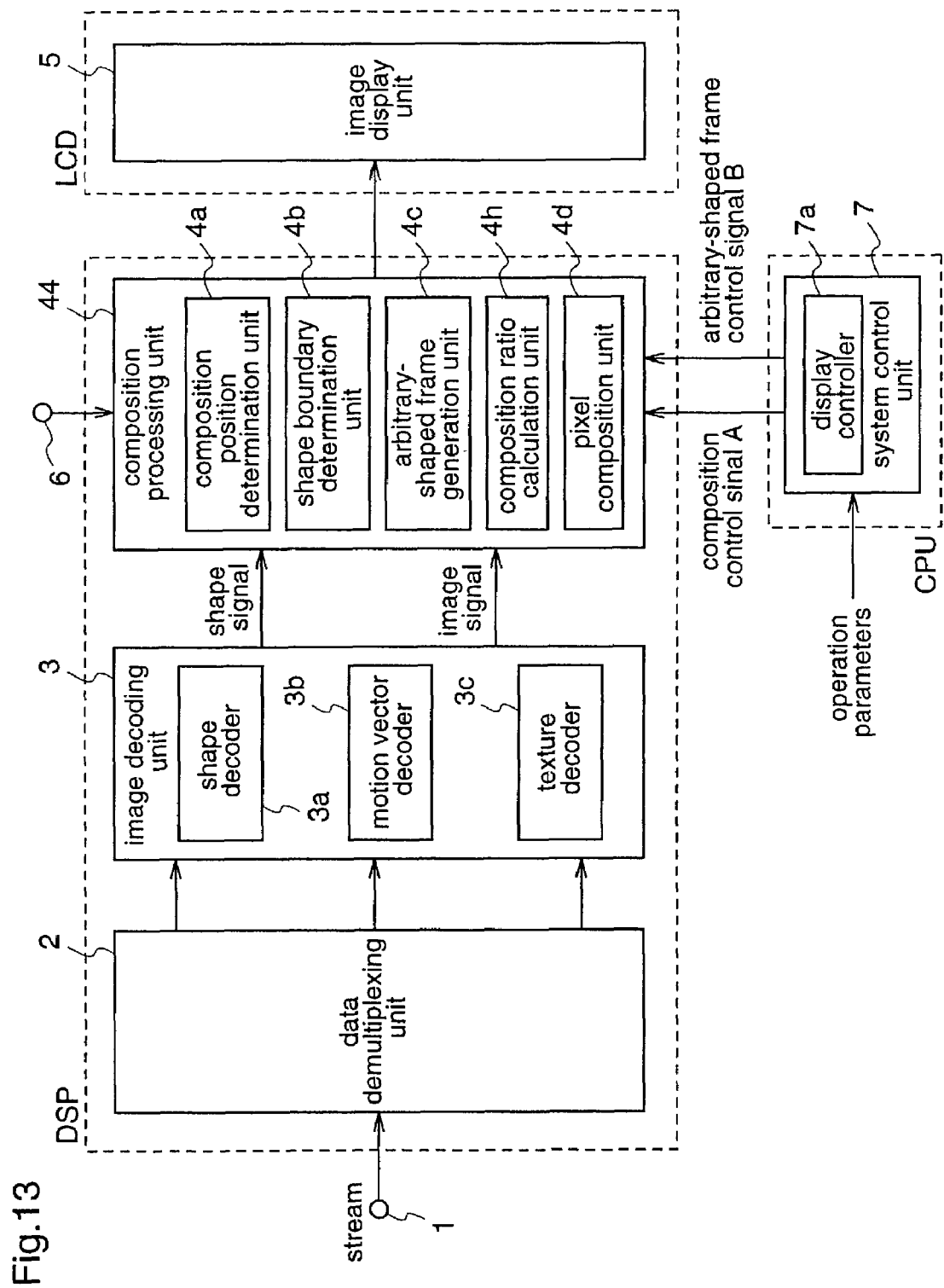
FIG. 13 is a block diagram illustrating the construction of an image composition apparatus according to a fifth embodiment of the invention.

FIG. 13 is a block diagram illustrating the construction of an image composition apparatus according to the fifth embodiment. In FIG. 13, the same reference numerals as those shown in FIG. 1 denote the same or corresponding parts. The image composition apparatus of this fifth embodiment is different from the image composition apparatus of the first embodiment only in that it is provided with a composition processing unit 44 in which a composition ratio calculation unit 4h is newly added. The composition ratio calculation unit 4h calculates a composition ratio between a target pixel (pixel to be processed) in a foreground image or an arbitrary-shaped frame pixel, and the corresponding pixel in a background image, on the basis of composition ratio information included in the composition control signal A that is transmitted from the system control unit 7, and the composition processing unit 44 performs image composition on the basis of the calculated composition ratio.

To be specific, when the shape signal has, as a pixel value, an intermediate value between a maximum value and a minimum value of the multi-valued signal, a weighted average of pixel values of texture signals is obtained between the foreground image and the corresponding background image, with the pixel value of the shape signal as a weighting factor, thereby obtaining a pixel value of a composite pixel. Thereby, the foreground image and the background image are displayed so that the background image is seen through the foreground image. An example of an arithmetic formula for performing the weighted averaging is as follows.

$$pel = (\alpha \times fgpel + (MAX - \alpha) \times bgpel)/MAX \qquad (1)$$

where fgpel, bgpel, and pel are the pixel values of the foreground image, background image, and composite image, respectively, α is the transmittance signal of the pixel value of the foreground image, and MAX is the maximum value of the shape signal.

When the α takes values from 0 to 255, the MAX is 255. Further, although the arithmetic operation for obtaining the weighted average includes a process of rounding the arithmetic result, the arithmetic operation expressed by formula (1) may have a process of discarding the fractional portion of the arithmetic result.

Figure 14:
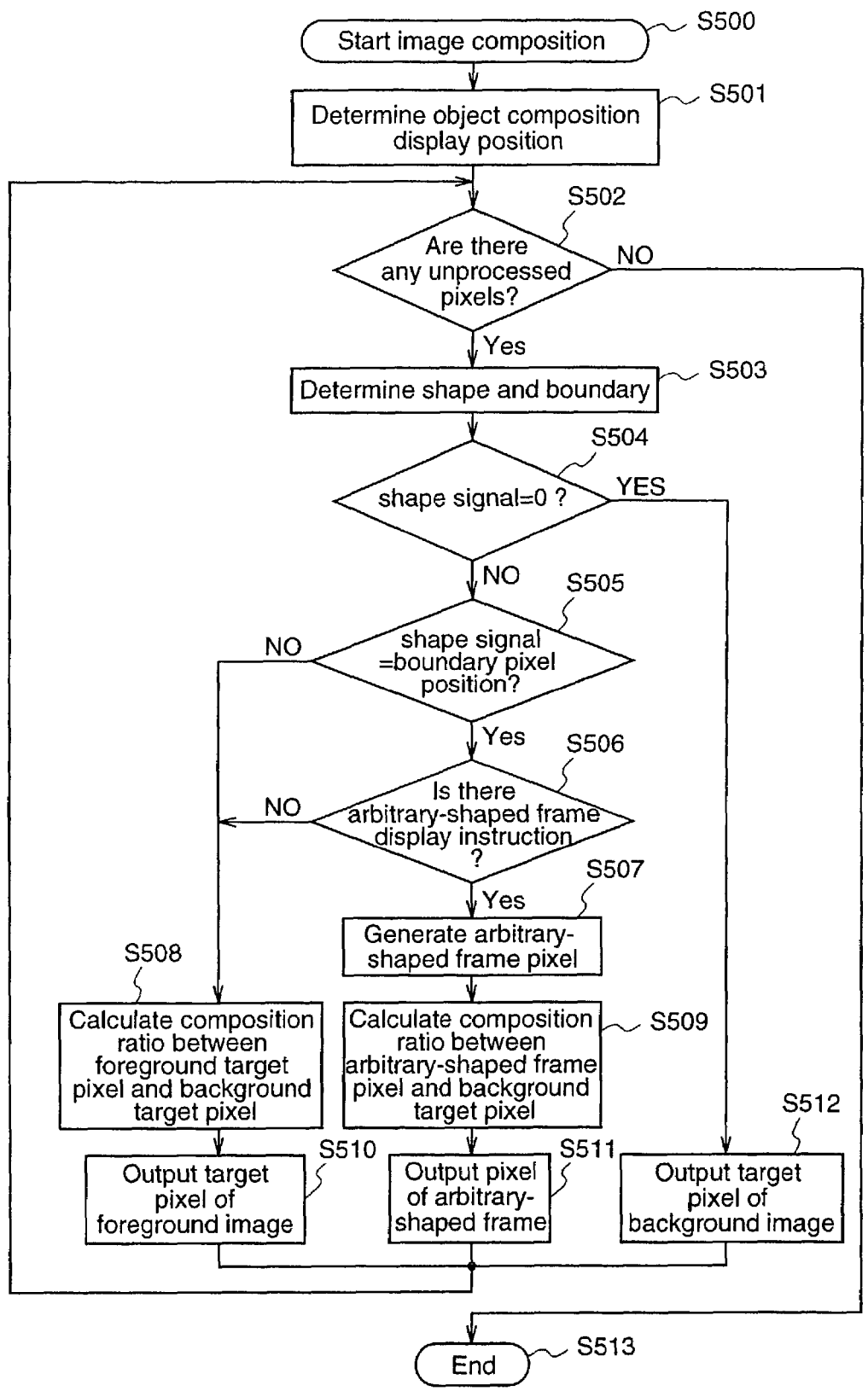
FIG. 14 is a flowchart illustrating the operation of the image composition apparatus according to the fifth embodiment.

FIG. 14 is a flowchart for explaining the image composition method according to the fifth embodiment. Hereinafter, the image composition method will be described with reference to FIG. 14.

Initially, when image composition is started (step S500), the composition position determination unit 4a in the composition processing unit 4 calculates an object composition and display position in a display region, on the basis of the composition position information (X component, Y component) included in the composition control signal A that is transmitted from the display controller 7a in the system control unit 7 (step S501).

Subsequently, in step S502 (unprocessed pixel check step), it is checked whether unprocessed pixels exist or not. When unprocessed pixels exist, the processing goes to step S503 (shape and boundary determination step), wherein the shape and boundary determination unit 4b determines the shape and boundary of the object, on the basis of the shape signal outputted from the image decoding unit 3.

When it is judged in step S504 that the value of the shape signal is zero, the processing goes to step S512, wherein the pixel composition unit 4d outputs the pixel value (texture signal) of a pixel of the background image, which pixel corresponds to the position of a target pixel (pixel to be processed) of the foreground image, as a texture signal of a composite image. On the other hand, when it is judged in step S504 that the value of the shape signal is nonzero and it is judged in step S505 that the shape signal is not a boundary pixel, the composition ratio calculation unit 4h calculates a composition ratio between the pixel value (texture signal) corresponding to the position of the target pixel in the foreground image, and the pixel value (texture signal) of a pixel in the background image, which pixel corresponds to the target pixel of the foreground image, on the basis of the transmittance signal (α) included in the composition control signal A that is transmitted from the display controller 7a in the system control unit 7 (step S508). Thereafter, the pixel composition unit 4d outputs the pixel value (texture signal) corresponding to the position of the target pixel in the foreground image, as a texture signal of a composite image (step S510).

Further, when it is judged in step S504 that the value of the shape signal is nonzero, and it is judged in step S505 that the shape signal is a boundary signal, and further, it is judged in step S506 that an instruction for displaying an arbitrary-shaped frame is not included in the arbitrary-shaped frame control B that is transmitted from the display controller 7a in the system control unit 7, the same processes as mentioned above are carried out in steps S508 and S510 to output a composite pixel.

Furthermore, when it is judged in step S504 that the value of the shape signal is nonzero, and it is judged in step S505 that the shape signal is a boundary signal, and further, it is judged in step S506 that an instruction for displaying an arbitrary-shaped frame is included in the arbitrary-shaped frame control B that is transmitted from the display controller 7a in the system control unit 7, the processing goes to step S507. In step S507, the arbitrary-shaped frame generation unit 4c generates an arbitrary-shaped frame pixel, and the composition ratio calculation unit 4h calculates a composition ratio between the pixel value (texture signal) of the arbitrary-shaped frame pixel and the pixel value (texture signal) of a pixel in the background image corresponding to the arbitrary-shaped frame pixel, on the basis of the transmittance signal ($\alpha$) (step S509), and the pixel composition unit 4d outputs the arbitrary-shaped frame pixel value as a texture signal of a composite image (step S511).

The target pixel in the foreground image which is outputted in step S510, the arbitrary-shaped frame pixel outputted in step S511, and the corresponding pixel in the background image which is outputted in step S512 are composited on the basis of the composition ratios that are calculated in steps S508 and S509.

The above-described process steps are repeated until it is judged in step S502 that there is no target pixel to be processed. When it is judged that there is no unprocessed pixel (target pixel) left, the image composition process is ended (step S513).

When the transmittance signal ($\alpha$) is not particularly set in the composition control signal A, the value of the transmittance signal ($\alpha$) is 255. That is, when the value of the transmittance signal ($\alpha$) is 255, a composite image in which the background image is not seen through the foreground image is generated.

Figure 15:
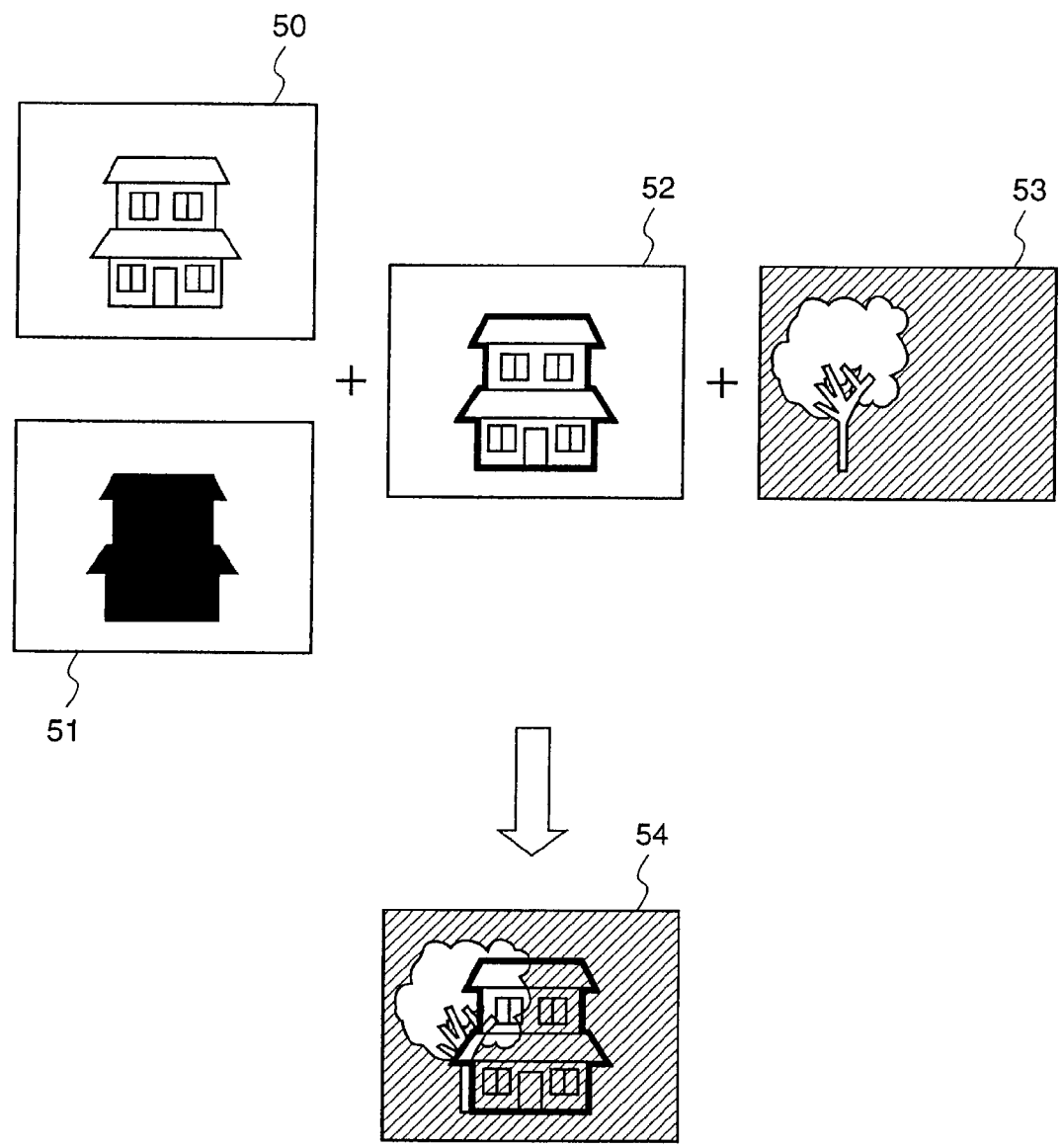
FIG. 15 is a schematic diagram illustrating images for explaining an image composition process according to the fifth embodiment.

FIG. 15 is a schematic diagram illustrating a composite image generated by the image composition method according to the fifth embodiment. Hereinafter, the image composition process will be described with reference to FIG. 15. Initially, the composition processing unit 44 receives a texture signal and a shape signal of an object, which are decoded by the image decoding unit 3. The texture signal is inputted to the composition processing unit 44 as a signal indicating a foreground image 50 in the composite image, and the shape signal is inputted to the composition processing unit 44 as a signal indicating a foreground image 51 in the composite image. Further, a texture signal indicating the background image 53 is inputted from the second input terminal 6.

Next, when an instruction for displaying an arbitrary-shaped frame is included in the arbitrary-shaped frame control signal B that is transmitted from the display controller 7a in the system control unit 7, the arbitrary-shaped frame generation unit 4c generates an arbitrary-shaped frame image 52. When an instruction to calculate a composition ratio is included in the composition control signal A that is transmitted from the display controller 7a in the system control unit 7, the composition ratio calculation unit 4h calculates a composition ratio between the foreground image and the background image (texture signal) 53 as well as a composition ratio between the arbitrary-shaped frame image 52 and the background image 53, and the composition processing unit 44 generates the composite image 54 from the foreground images (50 and 51), the arbitrary-shaped frame image 52, and the background image 53 on the basis of the calculated composition ratios, and outputs the composite image 54 to the image display unit 5.

As described above, according to the image composition apparatus of the fifth embodiment, the composition ratio between a target pixel in the foreground image or an arbitrary-shaped frame pixel, and the corresponding pixel in the background image is calculated on the basis of the composition ratio information included in the composition control signal A, and image composition is carried out on the basis of the calculated composition ratio, whereby a composite image in which the background image is seen through the foreground image can be generated. Thereby, a desired object can be displayed clearly and emphatically. Further, only a specific object can be clearly displayed without being shaded by another object, or a specific object can be deleted (transparentized), thereby providing the applicability to various kinds of applications such as games.

[Embodiment 6]

Next, an image composition method and an image composition apparatus according to a sixth embodiment of the present invention will be described.

Figure 16:
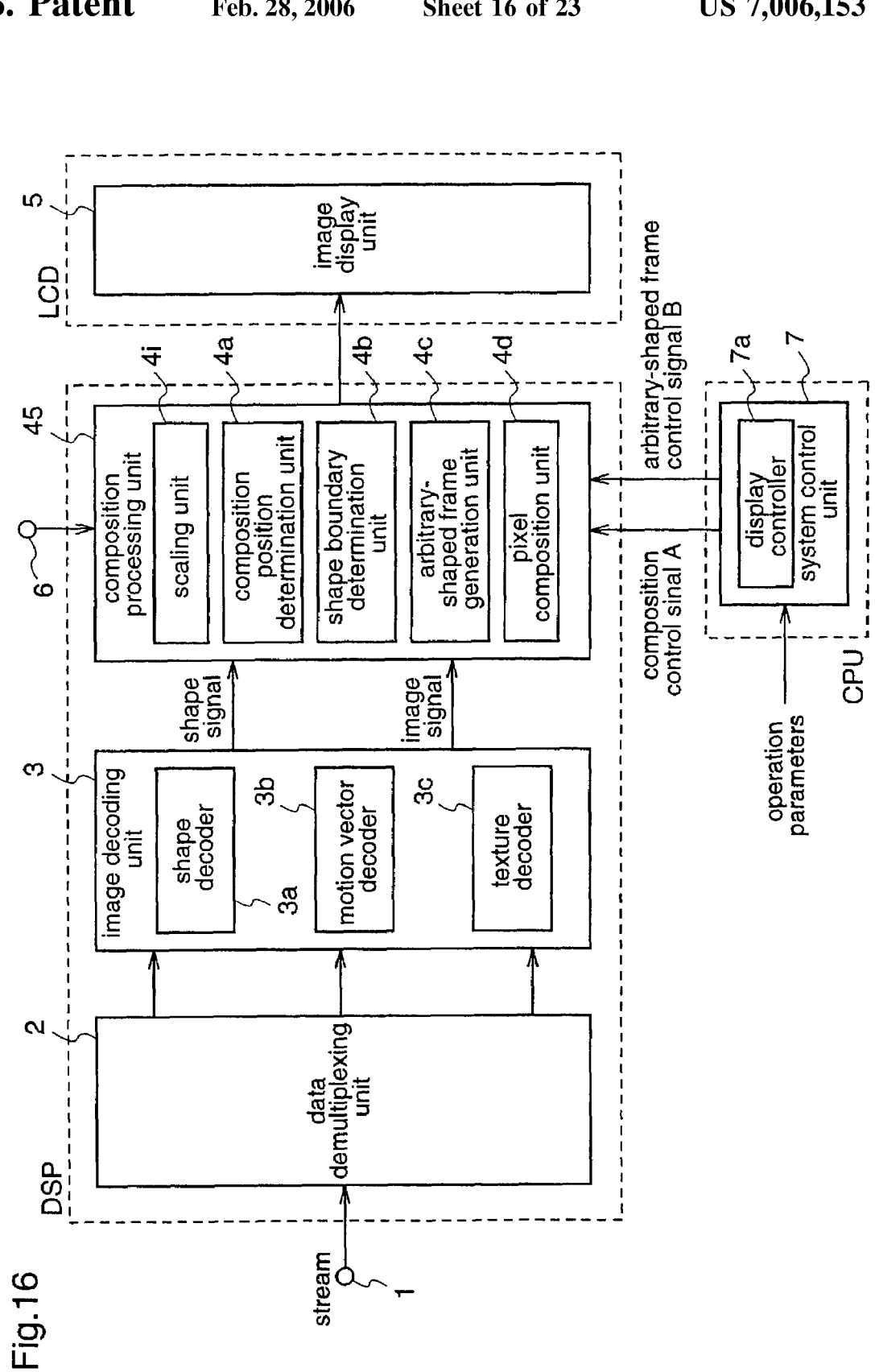
FIG. 16 is a block diagram illustrating the construction of an image composition apparatus according to a sixth embodiment of the invention.

FIG. 16 is a block diagram illustrating the construction of an image composition apparatus according to the sixth embodiment. In FIG. 16, the same reference numerals as those shown in FIG. 1 denote the same or corresponding parts. The image composition apparatus according to the sixth embodiment is different from the image composition apparatus of the first embodiment only in that it is provided with a composition processing unit 45 in which no scaling unit 4i is newly added. The scaling unit 4i performs scale-up and scale-down of an arbitrary-shaped object that is outputted from the image decoding unit 3, on the basis of scaling ratio information included in the composition control signal A that is transmitted from the display controller 7a in the system control unit 7.

Figure 17:
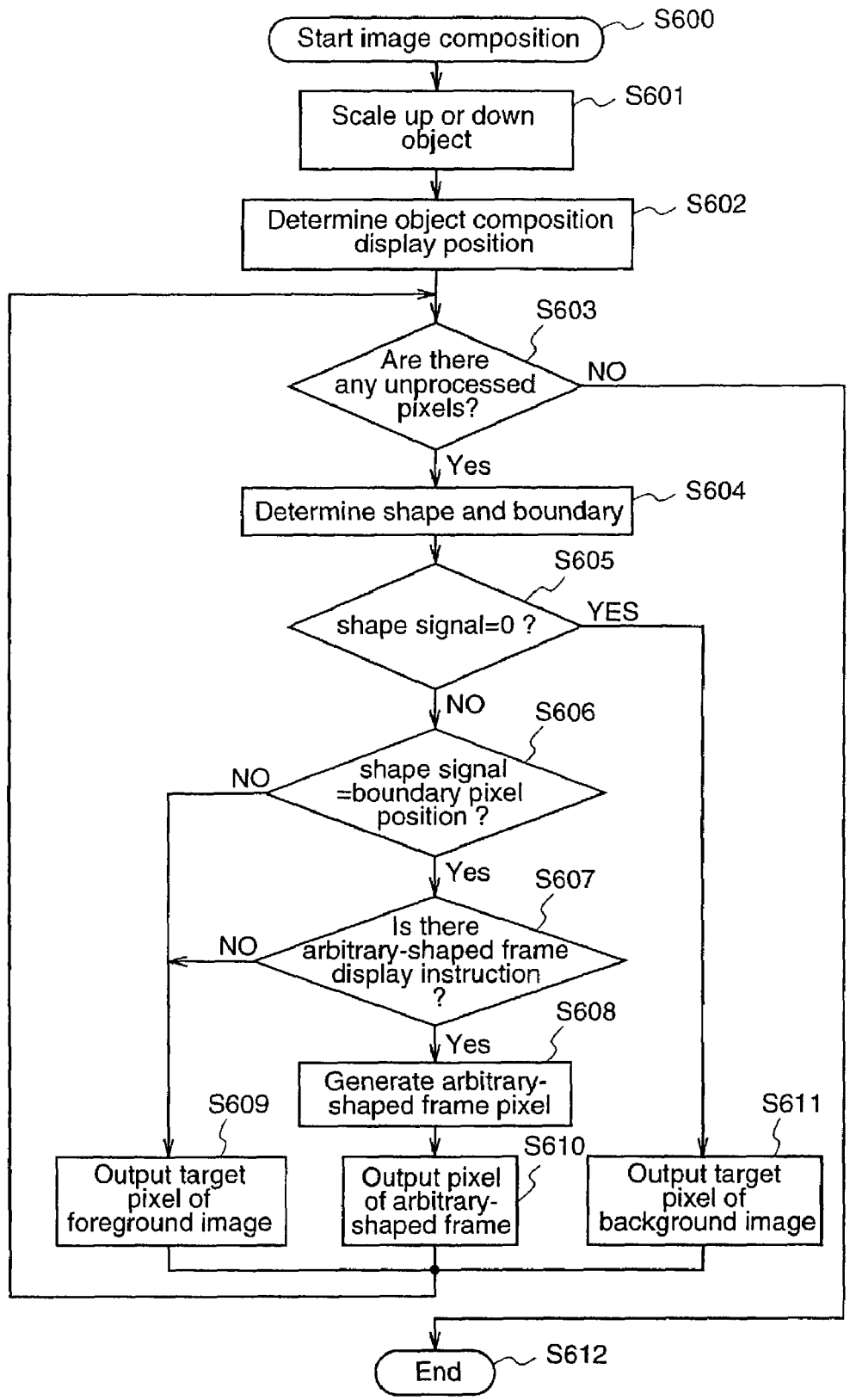
FIG. 17 is a flowchart illustrating the operation of the image composition apparatus according to the sixth embodiment.

FIG. 17 is a flowchart for explaining the image composition method according to the sixth embodiment. Hereinafter, the image composition method will be described with reference to FIG. 17.

In the image composition method according to the sixth embodiment, when image composition is started (step S600), the scaling unit 4i performs scale-up or scale-down of a shape signal and a texture signal of an arbitrary-shaped object, which are output from the image decoding unit 3, on the basis of the scaling ratio information included in the composition control signal A that is transmitted from the display controller 7a in the system control unit 7 (step S601), and the composition processing unit 45 performs image composition using the scaled-up or scaled-down shape signal and texture signal. For example, it is assumed that the scaling (scale-up or scale-down) ratios in the horizontal direction and the vertical direction, which are included in the scaling ratio information, are $\beta$ and $\gamma$, respectively, and the sizes of the shape signal (the texture signal) in the horizontal direction and the vertical direction are m and n, respectively. In this case, the sizes M and N of the above-mentioned signal in the horizontal direction and the vertical direction after the scaling process are represented by $$M = \beta \cdot m \cdot \delta$$

$$N = \gamma \cdot n \cdot \delta$$

where δ is the positive correction factor (δ>0).

Since the processes in steps S602~S612 are identical to those in steps S101~S111 which are described with respect to FIG. 2, repeated description is not necessary.

Figure 18:
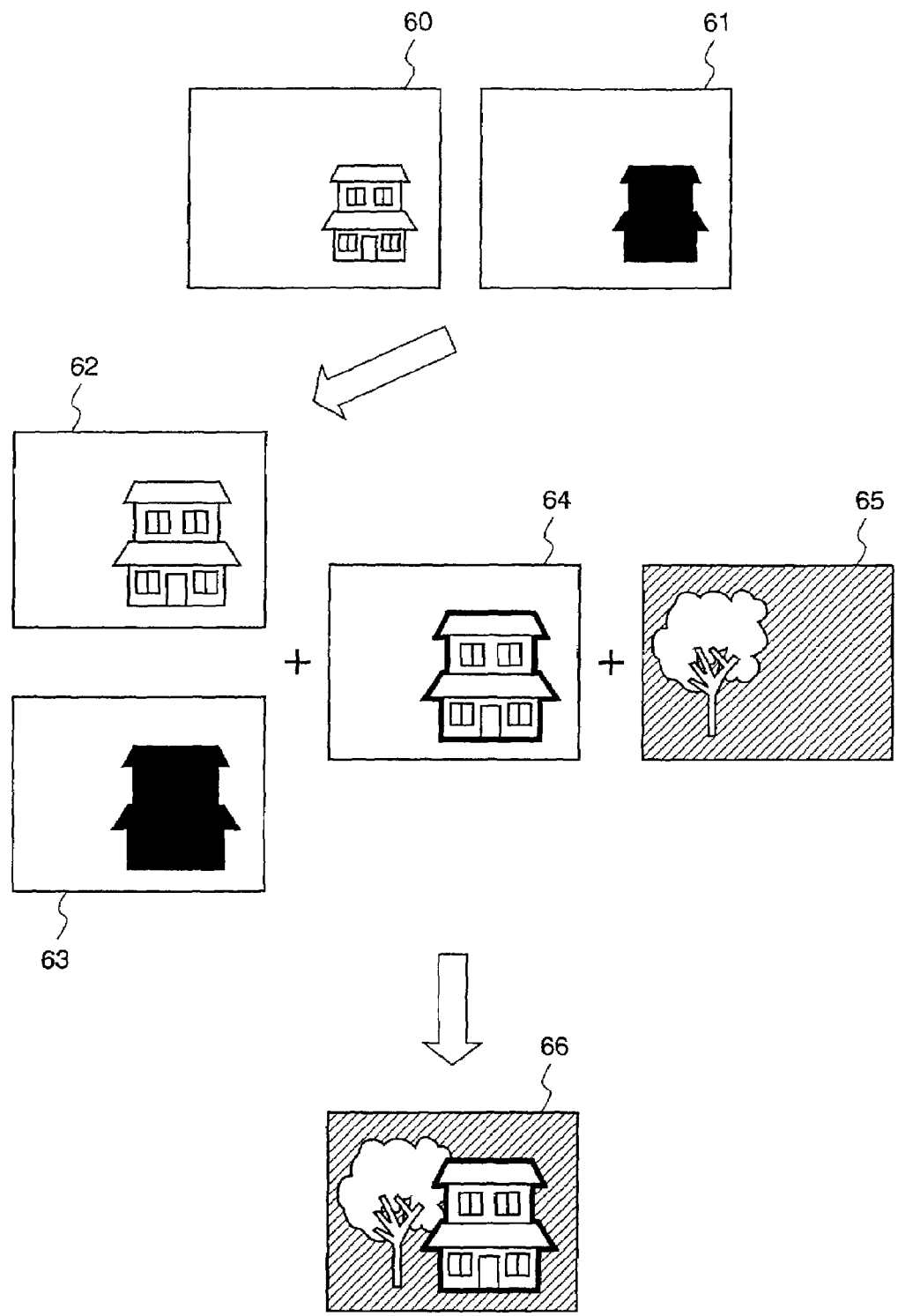
FIG. 18 is a schematic diagram illustrating images for explaining an image composition process according to the sixth embodiment.

FIG. 18 is a schematic diagram illustrating a composite image that is generated by the image composition method according to the sixth embodiment. Hereinafter, the image composition method will be described with reference to FIG. 18.

First of all, the composition processing unit 45 is provided with a texture signal and a shape signal of an object, which signals are decoded in the image decoding unit 3. To be specific, the texture signal is input to the composition processing unit 45 as a signal indicating a foreground image 60 in the composite image, and the shape signal is input to the unit 45 as a signal indicating a foreground image 61 in the composite image. Further, a texture signal indicating a background image 65 is input to the second input terminal 6.

In the case where an instruction for displaying an arbitrary-shaped frame is included in the arbitrary-shaped frame control signal B that is transmitted from the display controller 7a in the system control unit 7 and, further, an instruction for scaling (scale-up or scale-down) is included in the composition control signal A that is transmitted from the display controller 7a in the system control unit 7, the scaling unit 4i scales up or down the foreground images (60 and 61) to a predetermined size, and the arbitrary-shaped frame generation unit 4c generates an arbitrary-shaped frame image 64. Then, the composition processing unit 45 generates a composite image 66 from the scaled-up or scaled-down foreground images (62 and 63), the arbitrary-shaped frame image 64, and the background image 65, and outputs the composite image 66 to the image display unit 5.

As described above, according to the image composition apparatus of the sixth embodiment, the composition processing unit 45 is provided with the scaling unit 4i, and the scaling ratio between the target pixel in the foreground image or the arbitrary-shaped frame pixel, and the corresponding pixel in the background image is calculated on the basis of the scaling ratio information that is included in the composition control signal A from the system control unit 7, and then image composition is carried out on the basis of the calculated scaling ratio, whereby a composite image, in which a frame of an arbitrary shape is added to an scaled-up or scaled-down arbitrary-shaped object, can be generated. Thereby, the arbitrary-shaped object can be displayed clearly and emphatically. Further, a target object can be emphatically displayed by scaling up the target object, or scaling down objects other than the target object.

[Embodiment 7]

Hereinafter, an image composition method and an image composition apparatus according to a seventh embodiment of the present invention will be described.

Figure 19:
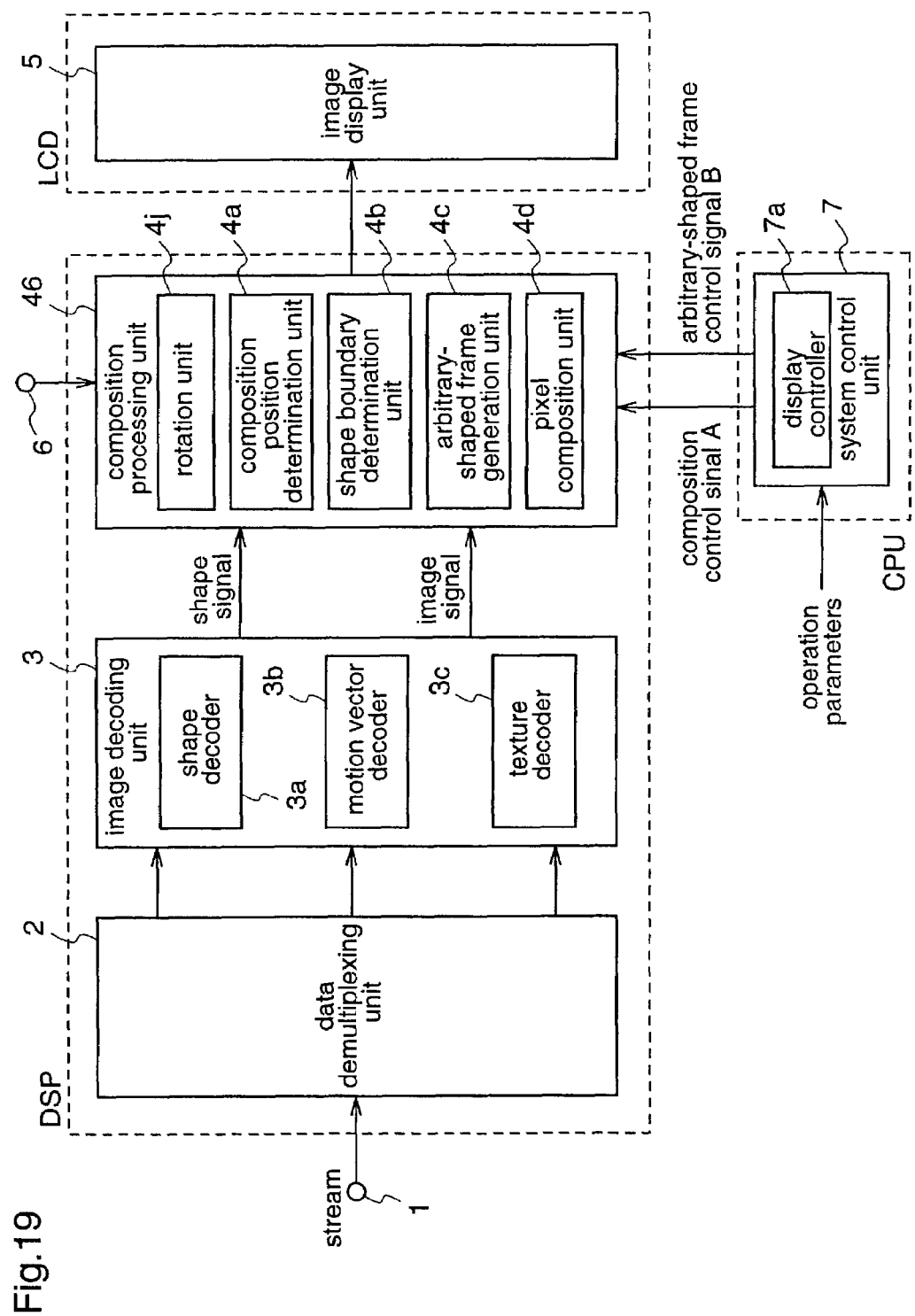
FIG. 19 is a block diagram illustrating the construction of an image composition apparatus according to a seventh embodiment of the invention.

FIG. 19 is a block diagram illustrating the construction of an image composition apparatus according to the seventh embodiment. In FIG. 19, the same reference numerals as those shown in FIG. 1 denote the same or corresponding parts. The image composition apparatus according to the seventh embodiment is different from the image composition apparatus according to the first embodiment only in that it is provided with a composition processing unit 46 in which a rotation unit 4j is newly added. The rotation unit 4j rotates an arbitrary-shaped object that is outputted from the image decoding unit 3, on the basis of rotation ratio information included in the composition control signal A that is transmitted from the display controller 7a in the system control unit 7.

Figure 20:
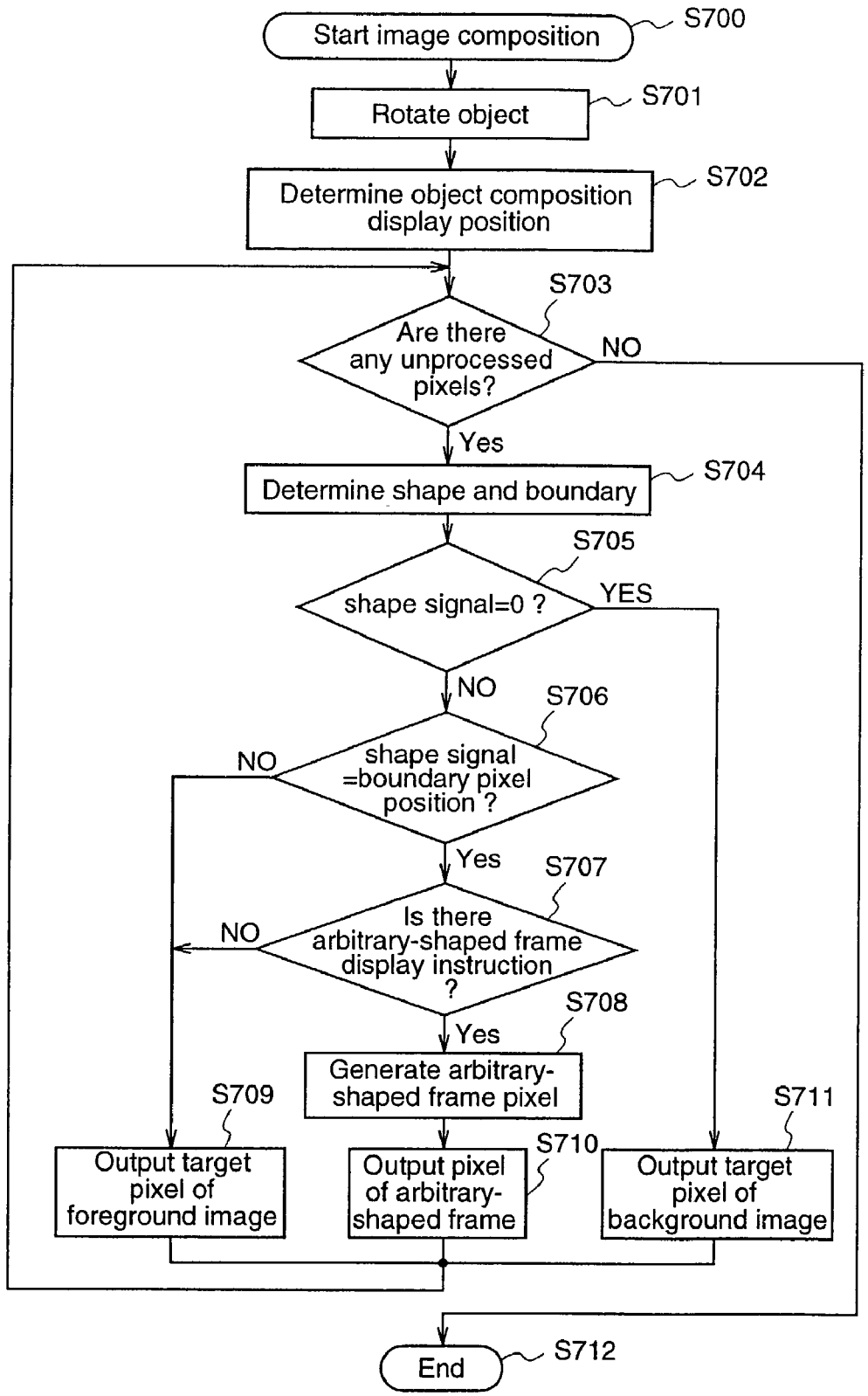
FIG. 20 is a flowchart illustrating the operation of the image composition apparatus according to the seventh embodiment.

FIG. 20 is a flowchart for explaining an image composition method according to the seventh embodiment. Hereinafter, the image composition method will be described with reference to FIG. 20.

In the image composition method according to the seventh embodiment, when image composition is started (step S700), the rotation unit 4j rotates a shape signal and a texture signal of an arbitrary-shaped object which are outputted from the image decoding unit 3, on the basis of the rotation ratio information included in the composition control A that is transmitted from the display controller 7a in the system control unit 7 (step S701), and the composition processing unit 46 performs image composition using the rotated shape signal and texture signal. Assuming that the rotation factor included in the rotation ratio information is θ, and the positional components of the shape signal and the texture signal in the horizontal direction and the vertical direction are x and y, respectively, the positional components X and Y after the rotation are represented by $$\begin{bmatrix} X \\ Y \end{bmatrix} = [x, y] \cdot \begin{bmatrix} \cos\theta & -\sin\theta \\ \sin\theta & \cos\theta \end{bmatrix} \qquad (2)$$

wherein the rotation factor θ is 0~2π.

Since the processes in steps S702~S712 are identical to the processes in steps S101~S111 which are described with respect to FIG. 2, repeated description is not necessary.

Figure 21:
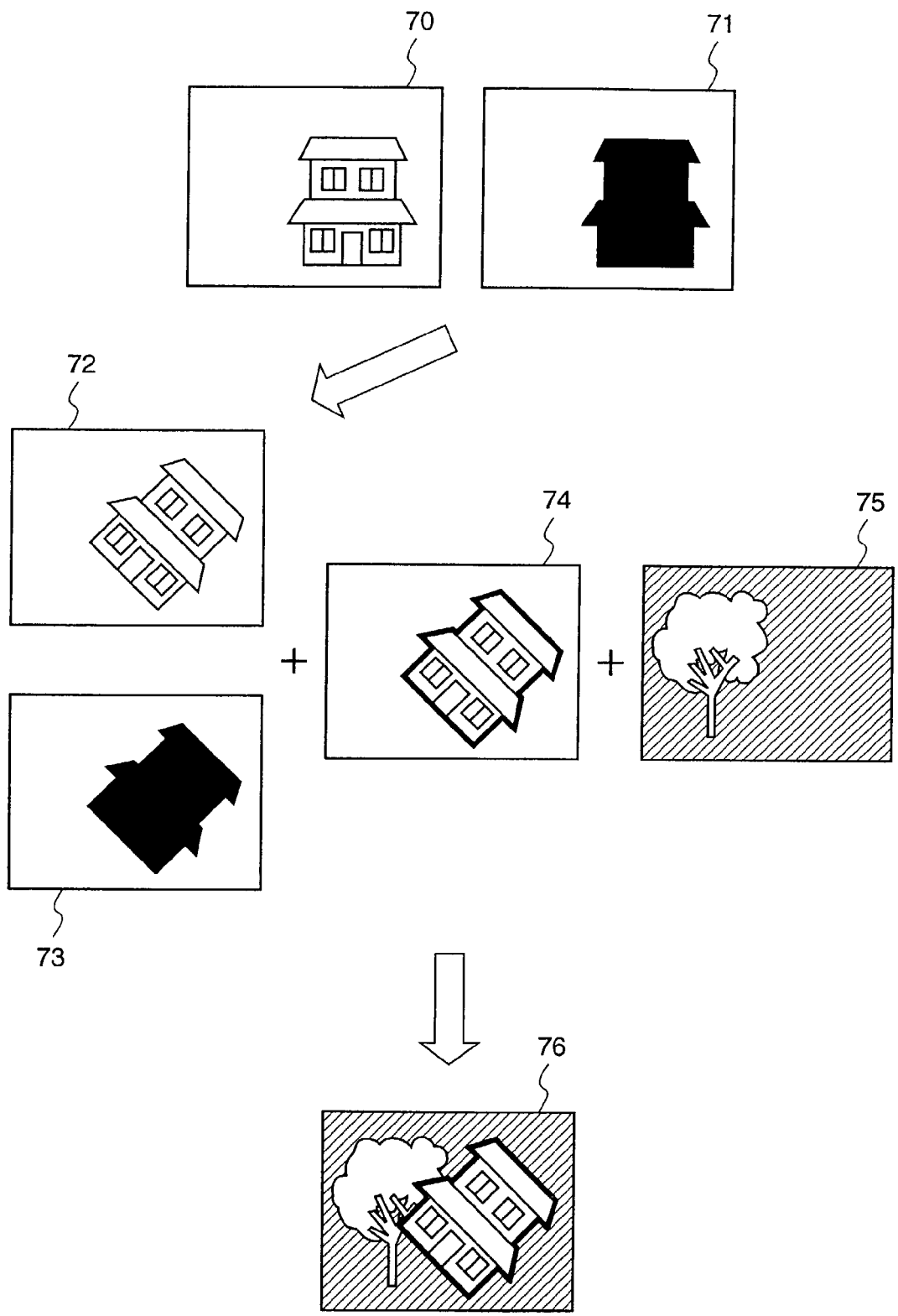
FIG. 21 is a schematic diagram illustrating images for explaining an image composition process according to the seventh embodiment.

FIG. 21 is a schematic diagram illustrating a composite image generated by the image composition method according to the seventh embodiment. Hereinafter, the image composition process will be described with reference to FIG. 21. Initially, the composition processing unit 46 is supplied with a texture signal and a shape signal of an object which are decoded by the image decoding unit 3. To be specific, the texture signal is input to the composition processing unit 46 as a signal indicating a foreground image 71 in the composite image, and the shape signal is input to the unit 46 as a signal indicating a foreground image 71 in the composite image. Further, a texture signal indicating a background image 75 is input to the second input terminal 6.

In the case where an instruction for displaying an arbitrary-shaped frame is included in the arbitrary-shaped frame control signal B that is transmitted from the display controller 7a in the system control unit 7 and, further, an instruction for rotation is included in the composition control signal A that is transmitted from the display controller 7a in the system control unit 7, the rotation unit 4j rotates the foreground images (70 and 71) at a predetermined angle, and the arbitrary-shaped frame generation unit 4c generates an arbitrary-shaped frame image 74. Then, the composition processing unit 46 generates a composite image 76 from the rotated foreground images (72 and 73), the arbitrary-shaped frame image 74, and the background image 75, and outputs the composite image 76 to the image display unit 5.

As described above, according to the image composition apparatus of the seventh embodiment, the composition processing unit 46 is provided with the rotation unit 4j, and the rotation ratio between the target pixel in the foreground image or the arbitrary-shaped frame pixel, and the corresponding pixel in the background image is calculated on the basis of the rotation ratio information that is included in the composition control signal A from the system control unit 7, and then image composition is carried out on the basis of the calculated rotation ratio, whereby a composite image, in which a frame of an arbitrary shape is added to a rotated arbitrary-shaped object, can be generated. Thereby, the arbitrary-shaped object can be displayed clearly and emphatically, and further, visual decoration effect can be achieved.

[Embodiment 8]

Next, an image composition method and an image composition apparatus according to an eighth embodiment of the present invention will be described.

Figure 22A:
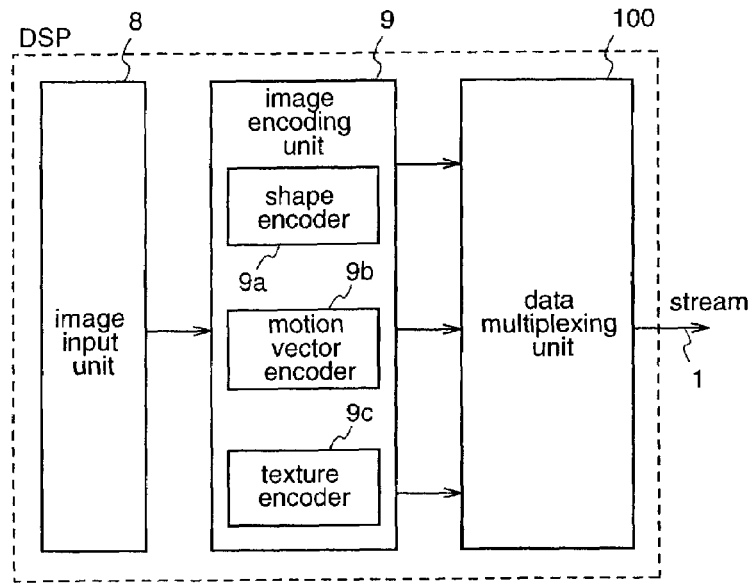
FIG. 22 is a block diagram illustrating the construction of an image composition apparatus according to an eighth embodiment of the invention.
Figure 22B:
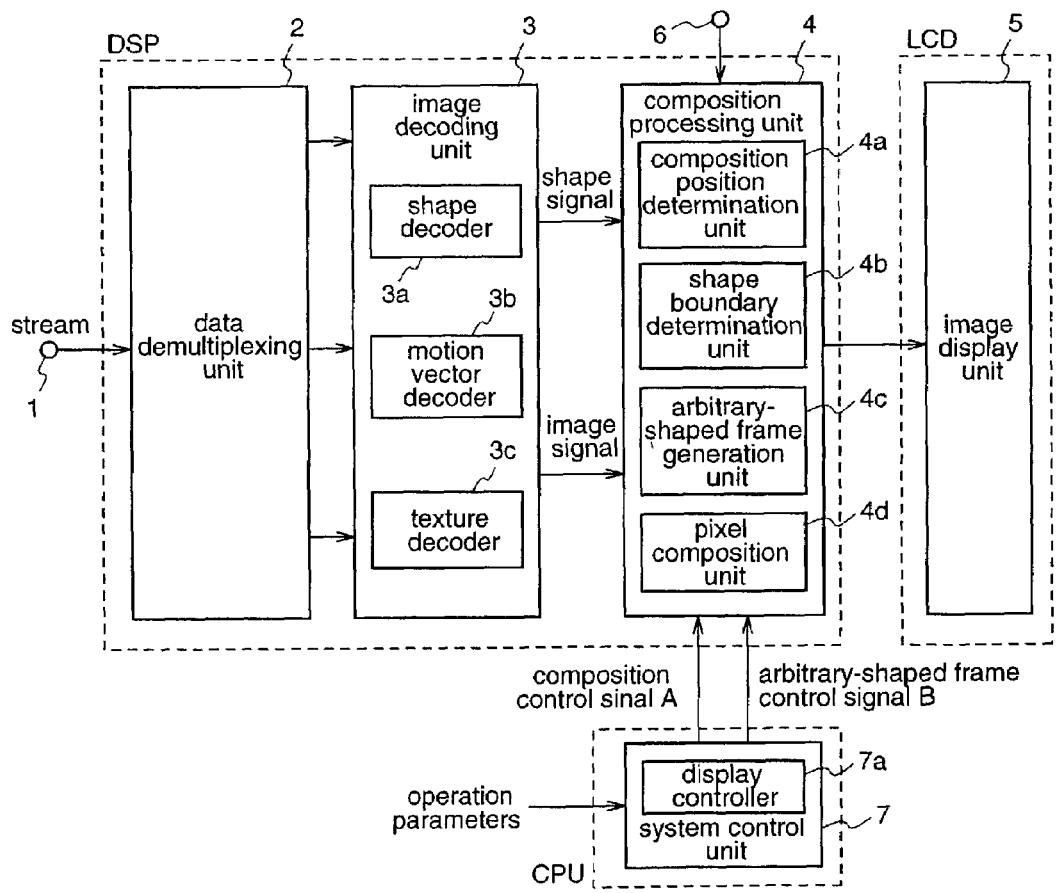

FIGS. 22(*a*) and 22(*b*) are block diagrams illustrating the construction of an image composition apparatus according to the eighth embodiment. To be specific, FIG. 22(*a*) shows an encoding apparatus, and FIG. 22(*b*) shows a decoding apparatus which is identical to the image composition apparatus according to the first embodiment.

The coding apparatus is implemented by using a DSP, and it is composed of an image input unit 8, an image encoding unit 9 for coding an input image, and a data multiplexing unit 100 for multiplexing the coded image and other information to output a stream. Further, the image encoding unit 9 is composed of a shape encoder 9a for coding shape data of the input image, a motion vector encoder 9b for coding motion vector data, and a texture encoder 9c for coding texture data.

Figure 23:
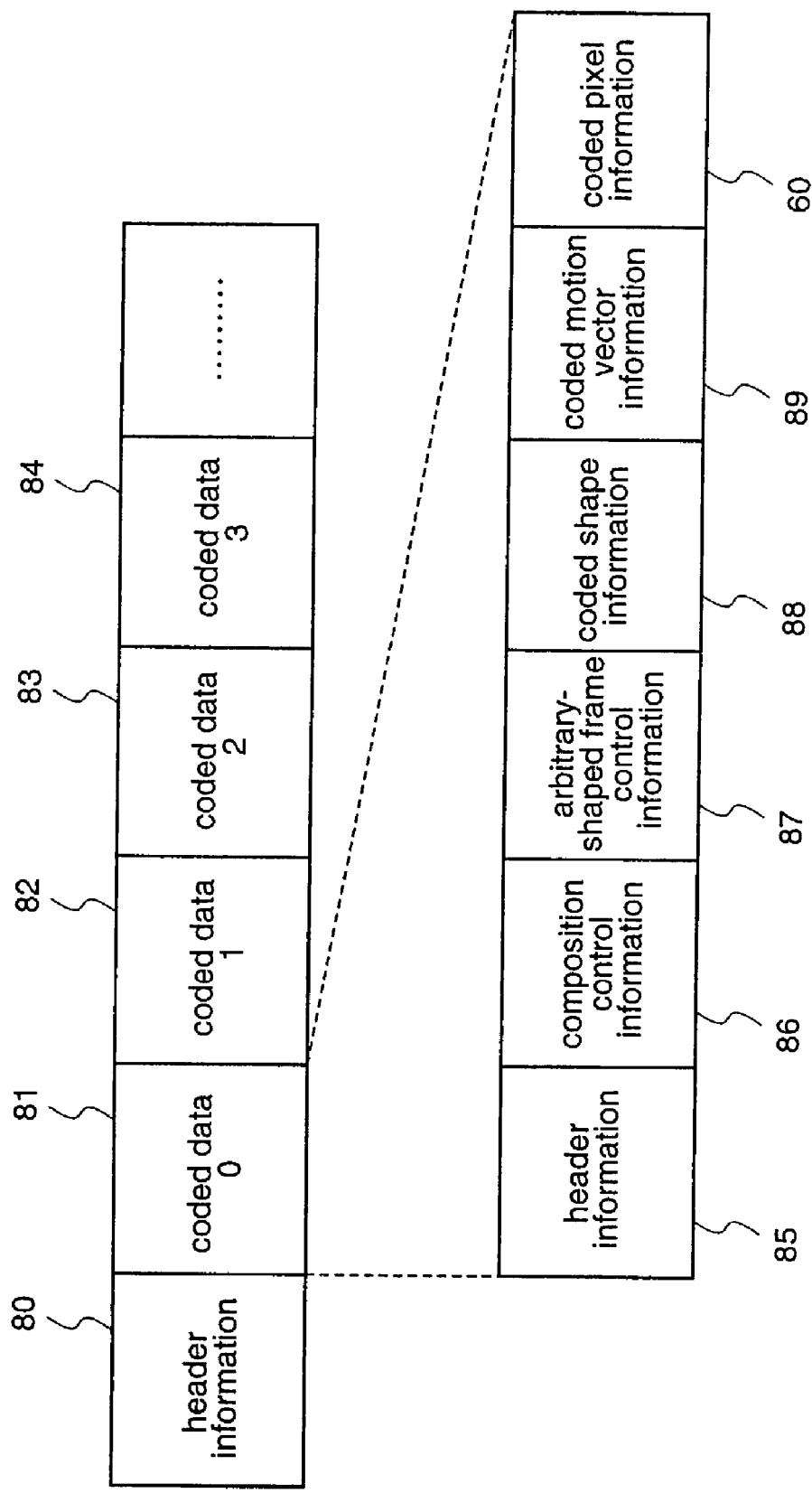
FIG. 23 is a diagram illustrating the structure of a bit stream to be processed by the image composition apparatus according to the eighth embodiment.

FIG. 23 is a diagram illustrating a data structure of a bit stream comprising coded data of the shape signal and the image signal.

In the bit stream having the data structure shown in FIG. 23, header information 80 describing the number of data included in the data structure and the like, is placed at the beginning, and the header information 80 is followed by coded data 81, 82, 83, 84, . . . corresponding to units of time of an object.

Further, the coded data 81 comprises a plurality of information as follows: header information 85 describing information for decoding the data; composition control information 86 for controlling generation of a composite image of a foreground image and a background image on the basis of decoded shape signal and image signal; arbitrary-shaped frame control information for controlling generation of an outline or frame having an arbitrary shape during the composition process; coded shape information 88 comprising coded shape data (shape signal); coded motion vector information 89 comprising coded motion vector data (motion vector signal); and coded pixel information 60 comprising coded texture data (pixel signal). The composition control information 86 and the arbitrary-shaped frame control information 87 are described in a user area that is defined by MPEG.

The coded shape information 88 comprises the shape data that has been coded by an arithmetic coding method, and further coded by variable-length coding. The coded pixel information 60 comprises the texture data that has been coded by a coding method such as DCT, and further coded by variable-length coding.

When the bit stream having the data structure shown in FIG. 23 is input to the input terminal 1 of the decoding apparatus, the bit stream is demultiplexed by the data demultiplexing unit 2, into the composition control information 86, the arbitrary-shaped frame control information 87, the coded shape information 88, the coded motion vector information 89, and the coded pixel information 60.

The coded shape information 88, the coded motion vector information 89, and the coded pixel information 60 are input to the image decoding unit 3, and decoded by the shape decoder 3a, the motion vector decoder 3b, and the texture decoder 3c, respectively, thereby outputting a shape signal and an image signal.

The decoded shape signal and image signal are input to the composition processing unit 4. When the composition control signal A and the arbitrary-shaped frame control signal B are not transmitted from the display controller 7a of the system control unit 7, image composition is carried out according to any of the flowcharts described for the first to seventh embodiments, using the composition control information 86 and the arbitrary-shaped frame control information 87 which are output from the data demultiplexing unit 2, thereby generating a composite image in which an arbitrary-shaped frame is added to an arbitrary-shaped object.

When the composition control signal A and the arbitrary-shaped frame control signal B are transmitted from the display controller 7a in the system control unit 7, a flag indicating any of plural composition control information (arbitrary-shaped frame control information) to be used may be provided in the header information 80, whereby a suitable image composition method can be selected from among plural image composition methods. Further, the flag may be provided in the header information 85 which is included in each of the coded data 81, 82, 83, 84, . . . corresponding to the respective units of time of the object, whereby the processing can be switched at some midpoint in the coded data.

As described above, according to the image composition apparatus of the eighth embodiment, when the composition control information 86 for controlling the image composition process and the arbitrary-shaped frame control information 87 for controlling generation of an arbitrary-shaped frame for the arbitrary-shaped object are included in the coded signals corresponding to the shape signal and the image signal, the composition control information 86 and the arbitrary-shaped frame control information 87 which are included in the coded signal are referred to, instead of the composition control signal A and the arbitrary-shaped frame control signal B which are transmitted from the display controller 7a in the system control unit 7, and a composite image, in which an arbitrary-shaped frame is added to the arbitrary-shaped object, is generated on the basis of the reference control information, whereby plural image composition methods can be selected.

While in the first to eighth embodiments the data separation unit, the image decoding unit, and the composition processing unit are implemented by DSPS, all or part of the constituents described above may be implemented by software using a computer or the like, with the same effects as described above.

What is claimed is:

1. An image composition method for compositing a first image signal with a second image signal, the first image signal forming a first image space, and comprising a shape signal indicating the shape of an arbitrary-shaped object and a texture signal indicating the texture of the object, the second image signal forming a second image space and comprising a texture signal indicating the texture of an image, said method comprising:
  determining a composition position of the arbitrary-shaped object in the first image space based on at least a composition control signal for controlling image composition;
  determining the shape and boundary of an arbitrary-shaped frame of the arbitrary-shaped object based on at least the shape signal, and an arbitrary-shaped frame control signal for controlling generation of the arbitrary-shaped frame;
  generating an arbitrary-shaped frame based on at least the shape and boundary information that is obtained in the shape and boundary determination and the arbitrary-shaped frame control signal;
  forming an arbitrary-shaped frame image in which the frame is added to the arbitrary-shaped object; and
  compositing the image of the arbitrary-shaped object in the first image space or the generated arbitrary-shaped frame image, with the corresponding image in the second image space, thereby generating a composite image that forms the third image space.

2. The method of claim 1, wherein said generating an arbitrary-shaped frame comprises selecting, as the shape of the frame of the arbitrary-shaped object, either an outline shape corresponding to an outline position based on at least the boundary information that is obtained in said determining the shape and boundary, or an arbitrary shape corresponding to an arbitrary position that encloses the arbitrary-shaped object, based on at least the arbitrary-shaped frame control signal.

3. The method of claim 1, wherein said generating an arbitrary-shaped frame comprises determining, on the basis of the arbitrary-shaped frame control signal, whether a frame of an outline shape corresponding to the arbitrary-shaped object should be generated in a position inside or outside the arbitrary-shaped object, which position abuts on the boundary of the object, or in both of positions inside and outside the arbitrary-shaped object, based on at least boundary information that is obtained in said determining a shape and boundary.

4. The method of claim 1 wherein in said generating the arbitrary-shaped frame, the width of the arbitrary-shaped frame can be arbitrarily set according to the arbitrary-shaped frame control signal.

5. The method of claim 1 wherein in said generating the arbitrary-shaped frame, the color of the arbitrary-shaped frame can be arbitrarily set according to the arbitrary-shaped frame control signal.

6. The method of claim 1, further comprising:
  calculating a composition ratio between the image of the arbitrary-shaped object in the first image space or the generated arbitrary-shaped frame image, and the corresponding image in the second image space;
  wherein, in said compositing the image, either the image of the arbitrary-shaped object in the first image space or the generated arbitrary-shaped frame image is composited with the corresponding image in the second image space, based on at least the composition ratio.

7. The method of claim 1, further comprising:
  calculating a scale-up or scale-down ratio between the image of the arbitrary-shaped object in the first image space or the generated arbitrary-shaped frame image, and the corresponding image in the second image space;
  wherein, in said compositing the image, either the image of the arbitrary-shaped object in the first image space or the generated arbitrary-shaped frame image is composited with the corresponding image in the second image space, based on at least the scale-up or scale-down ratio.

8. The method of claim 1, further comprising:
  calculating a rotation ratio between the image of the arbitrary-shaped object in the first image space or the generated arbitrary-shaped frame image, and the corresponding image in the second image space, based on at least the composition control information;
  wherein, in said compositing the image, either the image of the arbitrary-shaped object in the first image space or the generated arbitrary-shaped frame image is composited with the corresponding image in the second image space, based on at least the rotation ratio.

9. An image composition apparatus for compositing first image signal with a second image signal which forms a first image space, said first image signal comprising a shape signal indicating the shape of an arbitrary-shaped object and a texture signal indicating the texture of the object, the second image signal forming a second image space and comprising a texture signal indicating the texture of an image, thereby generating a composite image signal which forms a third image space, said apparatus comprising:
  a system control means for outputting a composition control signal for controlling image composition, and an arbitrary-shaped frame control signal for controlling generation of an arbitrary-shaped frame of the arbitrary-shaped object;
  a composition position determination means for determining a composition position of the arbitrary-shaped object in the first image space, based on at least the composition control signal from the system control means;
  a shape and boundary determination means for determining the shape and boundary of the arbitrary-shaped frame, based on at least the shape signal indicating the first image space, and the arbitrary-shaped frame control signal from the system control means;
  an arbitrary-shaped frame generation means for generating an arbitrary-shaped frame on the basis of the shape and boundary information from the shape and boundary determination means, and the arbitrary-shaped frame control signal from the system control means, and for creating an arbitrary-shaped frame image in which the frame is added to the arbitrary-shaped object; and
  a pixel composition means for compositing the image of the arbitrary-shaped object in the first image space or the generated arbitrary-shaped frame image, with the corresponding image in the second image space, thereby creating a composite image that forms the third image space.

10. An image composition apparatus of claim 9 further comprising:
  a shape type determination means for selecting, as the shape of the frame of the arbitrary-shaped object, either an outline shape corresponding to an outline position based on boundary information that is obtained by the shape and boundary determination means, or an arbitrary shape corresponding to an arbitrary position that encloses the arbitrary-shaped object, based on at least the arbitrary-shaped frame control signal.

11. An image composition apparatus of claim 9 further comprising:
  a display position determination means for determining, on the basis of the arbitrary-shaped frame control signal, whether a frame of an outline shape corresponding to the arbitrary-shaped object should be generated in a position inside or outside the arbitrary-shaped object, which position abuts on the boundary of the object, or in both of positions inside and outside the arbitrary-shaped object, based on at least of the boundary information that is obtained by the shape and boundary determination means.

12. An image composition apparatus of claim 9 further comprising:
a frame width setting means for setting a width of an arbitrary-shaped frame, based on at least the arbitrary-shaped frame control signal from the system control means; and
said arbitrary-shaped frame generation means generating an arbitrary-shaped frame having the width that is set by the frame width setting means, and creating an arbitrary-shaped frame image in which the frame is added to the arbitrary-shaped object.

13. An image composition apparatus of claim 9 further comprising:
a frame color setting means for setting an arbitrary color of an arbitrary-shaped frame on the basis of the arbitrary-shaped frame control signal; and
said arbitrary-shaped frame generation means generating an arbitrary-shaped frame having the color that is set by the frame color setting means, and creating an arbitrary-shaped frame image in which the frame is added to the arbitrary-shaped object.

14. An image composition apparatus of claim 9 further comprising:
a composition ratio calculation means for calculating a composition ratio between the image of the arbitrary-shaped object in the first image space or the generated arbitrary-shaped frame image, and the corresponding image in the second image space; and
said pixel composition means compositing the image of the arbitrary-shaped object in the first image space or the generated arbitrary-shaped frame image, with the corresponding image in the second image space, based on at least the composition ratio.

15. An image composition apparatus of claim 9 further comprising:
a scaling ratio calculation means for calculating a scale-up or scale-down ratio between the image of the arbitrary-shaped object in the first image space or the generated arbitrary-shaped frame image, and the corresponding image in the second image space; and
said pixel composition means compositing the image of the arbitrary-shaped object in the first image space or the generated arbitrary-shaped frame image, with the corresponding image in the second image space, based on at least the scale-up or scale-down ratio that is calculated by the scaling ratio calculation means.

16. An image composition apparatus of claim 9 further comprising:
a rotation ratio calculation means for calculating a rotation ratio between the image of the arbitrary-shaped object in the first image space or the generated arbitrary-shaped frame image, and the corresponding image in the second image space, based on at least the composition control information; and
said pixel composition means compositing the image of the arbitrary-shaped object in the first image space or the generated arbitrary-shaped frame image, with the corresponding image in the second image space, based on at least of the rotation ratio.

17. An image composition apparatus of claim 9, wherein
when a coded signal corresponding to the shape signal and image signal of the arbitrary-shaped object includes composition control information for controlling the image composition process and arbitrary-shaped frame control information for controlling generation of an arbitrary-shaped frame for the arbitrary-shaped object,
said composition position determination means, shape and boundary determination means, and arbitrary-shaped frame generation means refer to the composition control information and the arbitrary-shaped frame control information which are included in the coded signal, instead of the composition control signal and the arbitrary-shaped frame control signal which are transmitted from the system control means.

18. An image composition apparatus as of claim 9, wherein
when a coded signal corresponding to the shape signal and image signal of the arbitrary-shaped object includes composition control information for controlling the image composition process and arbitrary-shaped frame control information for controlling generation of an arbitrary-shaped frame for the arbitrary-shaped object,
said composition position determination means, shape and boundary determination means, and arbitrary-shaped frame generation means select either the composition control signal and the arbitrary-shaped frame control signal which are transmitted from the system control means, or the composition control information and the arbitrary-shaped frame control information which are included in the coded signal.

* * * * *